(12) United States Patent
Ochiai

(10) Patent No.: US 9,828,079 B2
(45) Date of Patent: Nov. 28, 2017

(54) OUTBOARD MOTOR AND VESSEL

(71) Applicant: YAMAHA HATSUDOKI KABUSHIKI KAISHA, Iwata-shi, Shizuoka (JP)

(72) Inventor: Katsumi Ochiai, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 3 days.

(21) Appl. No.: 14/996,584

(22) Filed: Jan. 15, 2016

(65) Prior Publication Data
US 2016/0129980 A1    May 12, 2016

Related U.S. Application Data

(63) Continuation of application No. 14/070,625, filed on Nov. 4, 2013, now Pat. No. 9,260,172.

(30) Foreign Application Priority Data

Feb. 25, 2013 (JP) ................................ 2013-035068

(51) Int. Cl.
*F01P 11/14* (2006.01)
*B63H 20/24* (2006.01)
(Continued)

(52) U.S. Cl.
CPC ............. *B63H 20/24* (2013.01); *B63H 20/28* (2013.01); *B63H 20/285* (2013.01); *F01N 3/043* (2013.01); *F01N 3/046* (2013.01); *F01N 3/10* (2013.01); *F01N 13/105* (2013.01); *F01N 13/107* (2013.01); *F01N 13/1805* (2013.01); *F01P 11/0285* (2013.01); *F01N 13/1827* (2013.01);
(Continued)

(58) Field of Classification Search
CPC .... F01P 3/202; F01P 2050/02; F01P 2050/12; F01P 11/0285; F01N 2590/021; F01N 2590/022; F01N 3/046; F01N 13/004; B63H 20/24
See application file for complete search history.

(56) References Cited

U.S. PATENT DOCUMENTS 5,494,467 A * 2/1996 Sohgawa ............. B63H 20/245
                                                              440/89 H
5,595,516 A * 1/1997 Matsumoto .......... B63H 20/245
                                                              440/89 C
(Continued)

FOREIGN PATENT DOCUMENTS

JP        2-146216 A      6/1990
JP        5-155382 A      6/1993
(Continued)

OTHER PUBLICATIONS

Ochiai, "Outboard Motor and Vessel", U.S. Appl. No. 14/070,625, filed Nov. 4, 2013.

*Primary Examiner* — Andrew Polay
(74) *Attorney, Agent, or Firm* — Keating and Bennett, LLP

(57) ABSTRACT

An outboard motor includes a catalyst housing passage disposed inside the V-shaped line, a cooling water passage including at least a portion disposed at a periphery of a catalyst and that guides cooling water that cools an exhaust passage and a vent hole disposed higher than the catalyst and that connects the interior of the cooling water passage to the exterior of the cooling water passage.

13 Claims, 22 Drawing Sheets

(51) Int. Cl.

| | |
|---|---|
| *B63H 20/28* | (2006.01) |
| *F01N 3/04* | (2006.01) |
| *F01N 3/10* | (2006.01) |
| *F01N 13/10* | (2010.01) |
| *F01N 13/18* | (2010.01) |
| *F01P 11/02* | (2006.01) |
| *F02B 61/04* | (2006.01) |

(52) U.S. Cl.
 CPC ......... *F01N 2590/021* (2013.01); *F01P 11/14* (2013.01); *F02B 61/045* (2013.01); *Y02T 10/20* (2013.01)

(56) References Cited

U.S. PATENT DOCUMENTS

| | | | |
|---|---|---|---|
| 5,671,779 A * | 9/1997 | Koishikawa | B63H 20/245 123/195 P |
| 5,830,022 A | 11/1998 | Nakase et al. | |
| 7,008,280 B1 | 3/2006 | Taylor et al. | |
| 2002/0166518 A1* | 11/2002 | Osakabe | F01P 3/202 123/41.28 |
| 2009/0215333 A1 | 8/2009 | Ochiai | |
| 2009/0215341 A1 | 8/2009 | Ochiai | |

FOREIGN PATENT DOCUMENTS

| | | |
|---|---|---|
| JP | 9-203316 A | 8/1997 |
| JP | 2000-154770 A | 6/2000 |
| JP | 2004-132305 A | 4/2004 |
| JP | 2009-197743 A | 9/2009 |
| JP | 2009-197744 A | 9/2009 |

\* cited by examiner

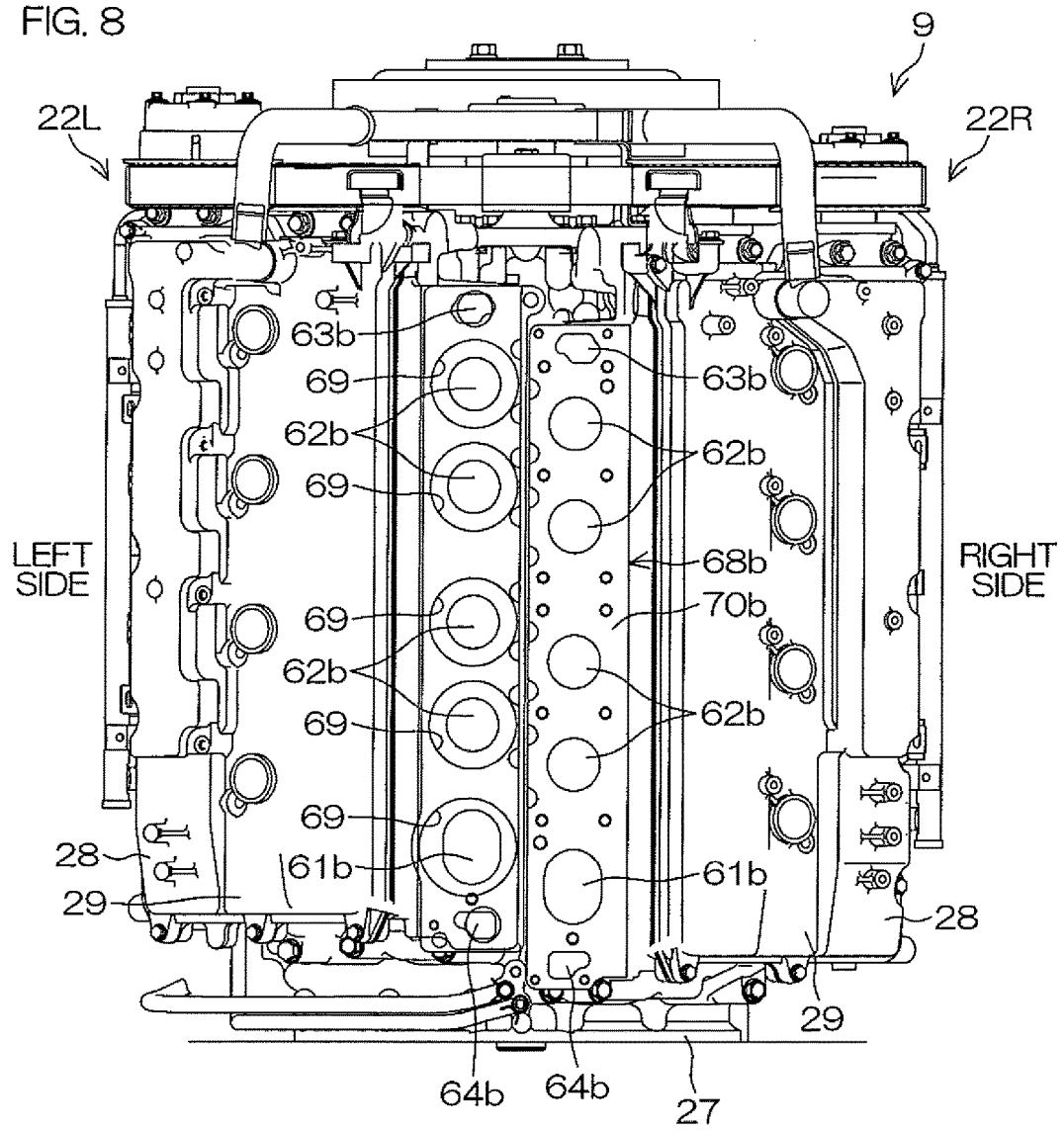

IGNITION ORDER #1→#8→#4→#3→#6→#5→#7→#2

IGNITION ORDER #1→#8→#4→#3→#6→#5→#7→#2

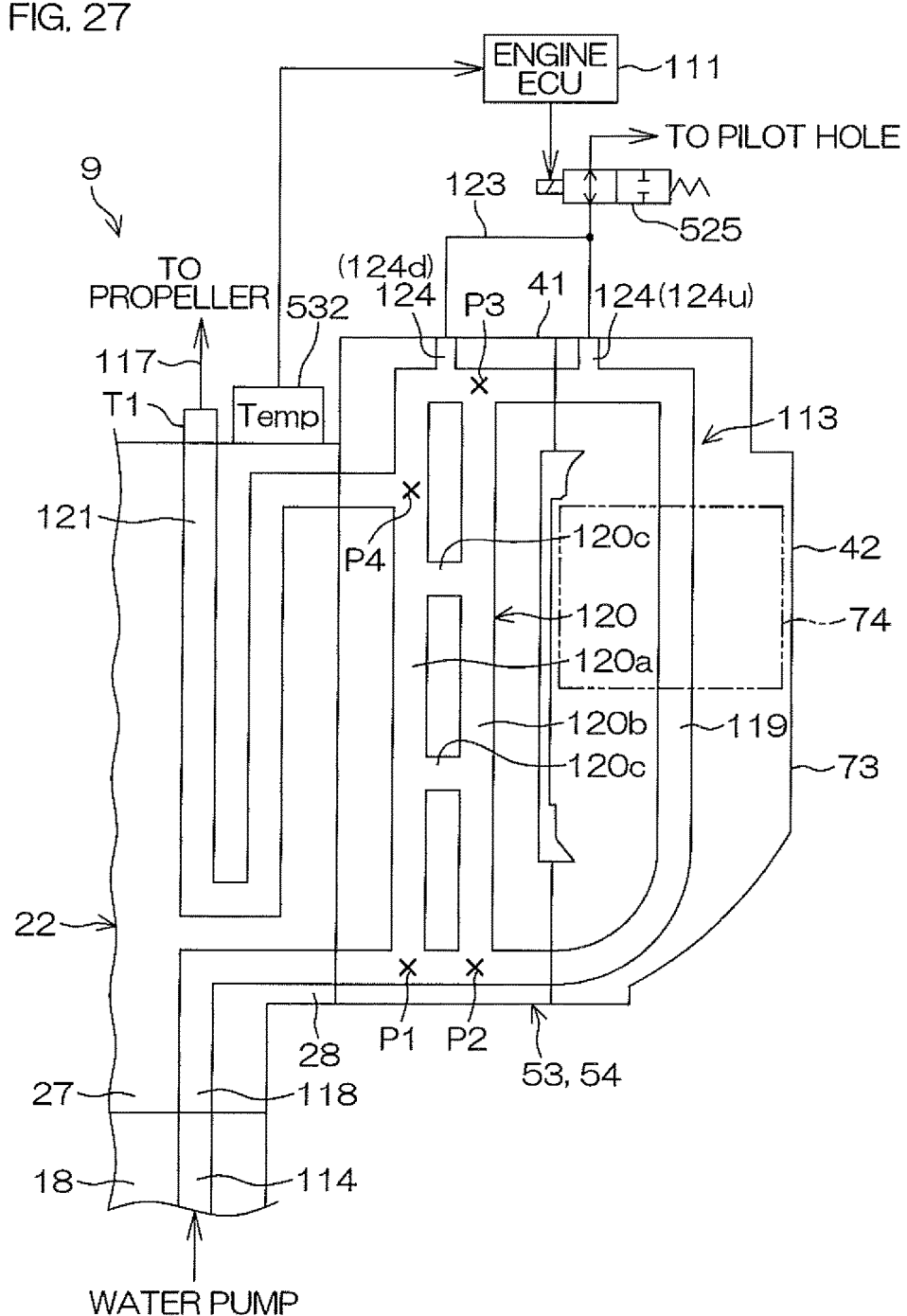

OUTBOARD MOTOR AND VESSEL

BACKGROUND OF THE INVENTION

1. Field of the Invention

The present invention relates to an outboard motor that propels a vessel and a vessel that includes the outboard motor.

2. Description of the Related Art

A conventional outboard motor includes a water pump that is driven by an engine. The water pump supplies water, taken in from a water inlet that opens at an outer surface of the outboard motor, to a water jacket provided in the engine.

Each of outboard motors disclosed in U.S. Pat. No. 7,867,048 and U.S. Pat. No. 8,002,597 include an exhaust pipe provided with a water jacket and a catalyst housed inside the exhaust pipe. As shown in FIG. 9 of each of U.S. Pat. No. 7,867,048 and U.S. Pat. No. 8,002,597, each outboard motor includes a vent hole (extension pipe 731) that discharges air inside the water jacket to the exterior of the water jacket.

When the water pump is driven by the engine, water outside the outboard motor is taken into the interior of the outboard motor from the water inlet, and the cooling water that is taken in rises inside the outboard motor toward the water jacket. The cooling water is thus supplied to the water jacket. In this process, the air inside the water jacket is discharged to the exterior of the water jacket through the vent hole. The water jacket is thus filled quickly with the cooling water. The cooling water supplied to the water jacket flows down inside the outboard motor towards an exhaust opening provided in a propeller.

The water inlet opens at the outer surface of the outboard motor, and the water inlet may thus be clogged by underwater foreign matter, such as seaweed, etc. There are thus cases where the supply of the cooling water to the water jacket is stopped.

With the conventional outboard motor described above, when the supply of cooling water to the water jacket stops, the cooling water inside the water jacket flows down inside the outboard motor towards the exhaust opening provided at the propeller and the air outside the water jacket flows into the water jacket through the vent hole. The cooling water inside the water jacket is thus discharged quickly.

Even if the supply of the cooling water to the water jacket is stopped, as long as the cooling water remains inside the water jacket, a cooling ability of some degree will be maintained. However, with the outboard motor described above, the cooling water remaining inside the water jacket is discharged rapidly and, therefore, the cooling ability of a cooling system that cools a high temperature portion of the engine, etc., is lowered immediately.

SUMMARY OF THE INVENTION

In order to overcome the previously unrecognized and unsolved challenges described above, a preferred embodiment of the present invention provides an outboard motor including an engine, an exhaust passage that guides an exhaust generated at the engine, a catalyst disposed inside the exhaust passage and that purifies the exhaust flowing inside the exhaust passage, a cooling water passage including at least a portion disposed at a periphery of the catalyst and that guides cooling water that cools the exhaust passage, a water pump disposed lower than the catalyst and that supplies water outside the outboard motor as the cooling water to the cooling water passage via a water inlet that opens at the outer surface of the outboard motor, a vent hole disposed higher than the catalyst and that connects the interior of the cooling water passage to the exterior of the cooling water passage, and a restriction valve that allows a fluid to flow from the interior of the cooling water passage to the exterior of the cooling water passage via the vent hole and that restricts the flow of the fluid from the exterior of the cooling water passage to the interior of the cooling water passage via the vent hole.

With this arrangement of the present preferred embodiment of the present invention, the exhaust generated at the engine is purified by the catalyst disposed inside the exhaust passage. At least a portion of the cooling water passage is disposed at the periphery of the catalyst. The water pump supplies the water outside the outboard motor to the cooling water passage via the water inlet that opens at the outer surface of the outboard motor. The water pump is disposed lower than the catalyst. At least a portion of the cooling water passage is thus disposed higher than the water pump. The cooling water taken into the outboard motor by the water pump thus rises inside the outboard motor toward the cooling water passage.

The interior of the cooling water passage is connected to the exterior of the cooling water passage by the vent hole. The vent hole is disposed higher than the catalyst. As mentioned above, the water pump is disposed lower than the catalyst. The vent hole is thus disposed higher than the water pump. The restriction valve allows fluid (at least one of either of gas and liquid) to flow from the interior of the cooling water passage to the exterior of the cooling water passage via the vent hole. Therefore, when the water pump delivers the cooling water to the cooling water passage, the air inside the cooling water passage is discharged to the exterior of the cooling water passage via the vent hole. The cooling water passage is thus rapidly filled with the cooling water.

When an abnormality, such as clogging of the water inlet, etc., occurs in the cooling device, the supply flow rate of the cooling water to the cooling water passage decreases. In this state, the cooling water remaining inside the cooling water passage tends to flow down due to its own weight. The restriction valve restricts the flow of fluid from the exterior of the cooling water passage to the interior of the cooling water passage via the vent hole. The air outside the cooling water passage is thus unlikely to enter into the cooling water passage via the vent hole and the cooling water is unlikely to be discharged from the cooling water passage. The rate of discharge of the cooling water from the cooling water passage is thus decreased and the retention time of the cooling water inside the cooling water passage is lengthened. Lowering of the cooling ability is thus significantly reduced or prevented when an abnormality occurs in the cooling device. A temperature rise of the exhaust passage and the catalyst is thus significantly reduced or prevented.

In the present preferred embodiment, the flow passage area of the vent hole may be smaller than the flow passage area of the cooling water passage.

With this arrangement of the present preferred embodiment of the present invention, the interior of the cooling water passage is connected to the exterior of the cooling water passage via the vent hole and, therefore, a portion of the cooling water inside the cooling water passage is discharged from the cooling water passage through the vent hole. The flow passage area of the vent hole is smaller than the flow passage area of the cooling water passage. A large portion of the cooling water inside the cooling water passage thus flows toward the downstream end of the cooling water passage that cools the exhaust passage and the catalyst. In other words, the amount of cooling water that is discharged from the cooling water passage before reaching the downstream end of the cooling water passage is small. The exhaust passage and the catalyst are thus cooled reliably.

In the present preferred embodiment, the vent hole may be positioned at an uppermost portion of the cooling water passage.

With this arrangement of the present preferred embodiment of the present invention, the vent hole is positioned at the uppermost portion of the cooling water passage and air is thus discharged reliably from the uppermost portion of the cooling water passage. Therefore, not only is the cooling water passage filled with the cooling water rapidly but the cooling water reaches the uppermost portion of the cooling water passage reliably as well. The exhaust passage and the catalyst are thus cooled efficiently.

In the present preferred embodiment, the vent hole may be positioned further downstream than the catalyst in the direction of flow of the cooling water.

With this arrangement of the present preferred embodiment of the present invention, the vent hole is positioned further downstream than the catalyst in the direction of flow of the cooling water and, therefore, the cooling water that is to be discharged from the cooling water passage via the vent hole also passes close to the catalyst. The catalyst is thus cooled efficiently.

In the present preferred embodiment, the outboard motor may further include a pilot hole opening into air and a pilot piping defining at least a portion of a pilot passage that guides the fluid between the vent hole and the pilot hole. The restriction valve may be disposed in the pilot passage.

With this arrangement of the present preferred embodiment of the present invention, the pilot hole that opens at the outer surface of the outboard motor is exposed to air. The pilot hole is connected to the vent hole by the pilot passage. At least a portion of the pilot passage is defined by the pilot piping and the restriction valve is disposed in the pilot passage. When the cooling water passage is filled with the cooling water, the air inside the cooling water passage flows into the pilot passage from the vent hole and flows from the pilot passage to the pilot hole. The air inside the cooling water passage is thus discharged into air from the pilot hole. After the cooling water passage is filled with the cooling water, a portion of the cooling water in the cooling water passage is discharged into air from the pilot hole. A vessel operator can thus confirm that the cooling water is being supplied to the cooling water passage by seeing the discharge of water from the pilot hole.

In the present preferred embodiment, the flow passage area of the pilot passage may be smaller than the flow passage area of the cooling water passage.

With this arrangement of the present preferred embodiment of the present invention, the pilot passage is connected to the interior of the cooling water passage via the vent hole and, therefore, a portion of the cooling water inside the cooling water passage is discharged from the cooling water passage to the pilot passage. The flow passage area of the pilot passage is smaller than the flow passage area of the cooling water passage. A large portion of the cooling water inside the cooling water passage thus flows toward the downstream end of the cooling water passage and cools the exhaust passage and the catalyst. In other words, the amount of cooling water that is discharged from the cooling water passage before reaching the downstream end of the cooling water passage is small. The exhaust passage and the catalyst are thus cooled reliably.

In the present preferred embodiment, the outboard motor may further include an exhaust manifold defining at least a portion of the exhaust passage and guiding the exhaust generated at the engine to the catalyst. A portion of the cooling water passage may be provided in the exhaust manifold. The vent hole may be disposed between the exhaust manifold and the catalyst in the direction of flow of the cooling water.

With this arrangement of the present preferred embodiment of the present invention, the exhaust is guided to the catalyst by the exhaust manifold that defines at least a portion of the exhaust passage. A portion of the cooling water passage is provided in the exhaust manifold, and the exhaust manifold is thus cooled by the cooling water supplied from the water pump. In the direction of flow of the cooling water, the vent hole is disposed between the exhaust manifold and the catalyst. That is, in the direction of flow of the cooling water, the vent hole extends from a portion of the cooling water passage positioned between the exhaust manifold and the catalyst to the exterior of the cooling water passage. A portion of the fluid present between the exhaust manifold and the catalyst is thus discharged from the vent hole. Retention of the cooling water between the exhaust manifold and the catalyst is thus prevented. The exhaust passage and the catalyst are thus cooled efficiently.

In the present preferred embodiment, the vent hole may be positioned at an uppermost portion of the exhaust manifold.

With this arrangement of the present preferred embodiment of the present invention, the vent hole is positioned at the uppermost portion of the exhaust manifold and, therefore, the air at the uppermost portion of the exhaust manifold is reliably discharged from the vent hole. A portion of the cooling water passage is provided in the exhaust manifold. The cooling water thus reaches the uppermost portion of the exhaust manifold reliably. The exhaust passage and the catalyst are thus cooled efficiently.

In the present preferred embodiment, the outboard motor may further include an engine cover covering the engine. The catalyst may be disposed inside the engine cover.

With this arrangement of the present preferred embodiment of the present invention, the catalyst is disposed inside the engine cover that covers the engine, and the engine and the catalyst are thus close to each other. The engine is disposed higher than the water surface. The catalyst is thus disposed higher than the water surface and the height from the water surface to the catalyst is large. Water that enters into the exhaust passage from the exhaust opening that is open underwater is thus unlikely to reach the catalyst. Degradation of the catalyst due to wetting by water is thus prevented.

In the present preferred embodiment, at least a portion of the exhaust passage may preferably be made of a material that contains aluminum. At least a portion of the cooling water passage may preferably be made of a material that contains aluminum.

With this arrangement of the present preferred embodiment of the present invention, at least a portion of the exhaust passage is preferably made of a material containing aluminum, which is an example of a light metal. Similarly, at least a portion of the cooling water passage is preferably made of a material containing aluminum. The outboard motor is thus light in weight. On the other hand, aluminum is lower in heat resistance than iron and, therefore, the heat resistance of the exhaust passage is lower than when the entire exhaust passage is made of a material having iron as the main component. However, the exhaust passage is cooled reliably by the supply of the cooling water and, therefore, not only is the outboard motor light in weight but melting of a portion of the exhaust passage is also prevented.

In the present preferred embodiment, the restriction valve may include an internal flow passage, including an inlet connected to the vent hole and an outlet connected to the vent hole via the inlet, and a valve element that reduces the flow passage area of the internal flow passage when the pressure at the inlet is lower than the pressure at the outlet.

With this arrangement of the present preferred embodiment of the present invention, the inlet of the internal flow passage of the restriction valve is disposed farther to a vent hole side than to an outlet of the internal flow passage of the restriction valve, and the outlet of the internal flow passage of the restriction valve is connected to the vent hole via the inlet of the internal flow passage of the restriction valve. When the pressure at the inlet of the internal flow passage is lower than the pressure at the outlet of the internal flow passage, the valve element decreases the flow passage area of the internal flow passage. That is, when the pressure inside the cooling water passage decreases in accordance with the occurrence of an abnormality in the cooling device, the valve element decreases the flow passage area of the internal flow passage. The inflow of air into the cooling water passage is thus restricted by the restriction valve and the discharge rate of the cooling water from the cooling water passage decreases. Lowering of the cooling ability is thus significantly reduced or prevented.

In the present preferred embodiment, the restriction valve may be a normally open solenoid valve. The outboard motor may further include a temperature detecting device that detects the temperature of the engine, and a controller programmed to close the restriction valve when the temperature of the engine is not less than a predetermined value.

With this arrangement of the present preferred embodiment of the present invention, the normally open solenoid valve is used as the restriction valve. The controller opens and closes the solenoid valve as the restriction valve based on the temperature of the engine. Specifically, the engine temperature is detected by the temperature detecting device and the detection value of the temperature detecting device is input into the controller. The controller closes the restriction valve when the engine temperature is not less than the predetermined value (for example, an overheating temperature). That is, when the engine temperature reaches the predetermined value due to an abnormality of the cooling device, the controller closes the restriction valve and maintains the state in which the restriction valve is closed until the engine temperature falls below the predetermined value. Therefore, when an abnormality of the cooling device occurs, the discharge of the cooling water from the cooling water passage is restricted and the lowering of the cooling ability is significantly reduced or prevented. A temperature rise of the exhaust passage and the catalyst is thus significantly reduced or prevented.

Another preferred embodiment of the present invention provides a vessel including the outboard motor and a hull propelled by the outboard motor.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a rear view of a main body of the engine.

FIG. 27 is a schematic view of a cooling water passage provided in an engine according to a fifth preferred embodiment of the present invention.

DETAILED DESCRIPTION OF THE PREFERRED EMBODIMENTS

Figure 1:
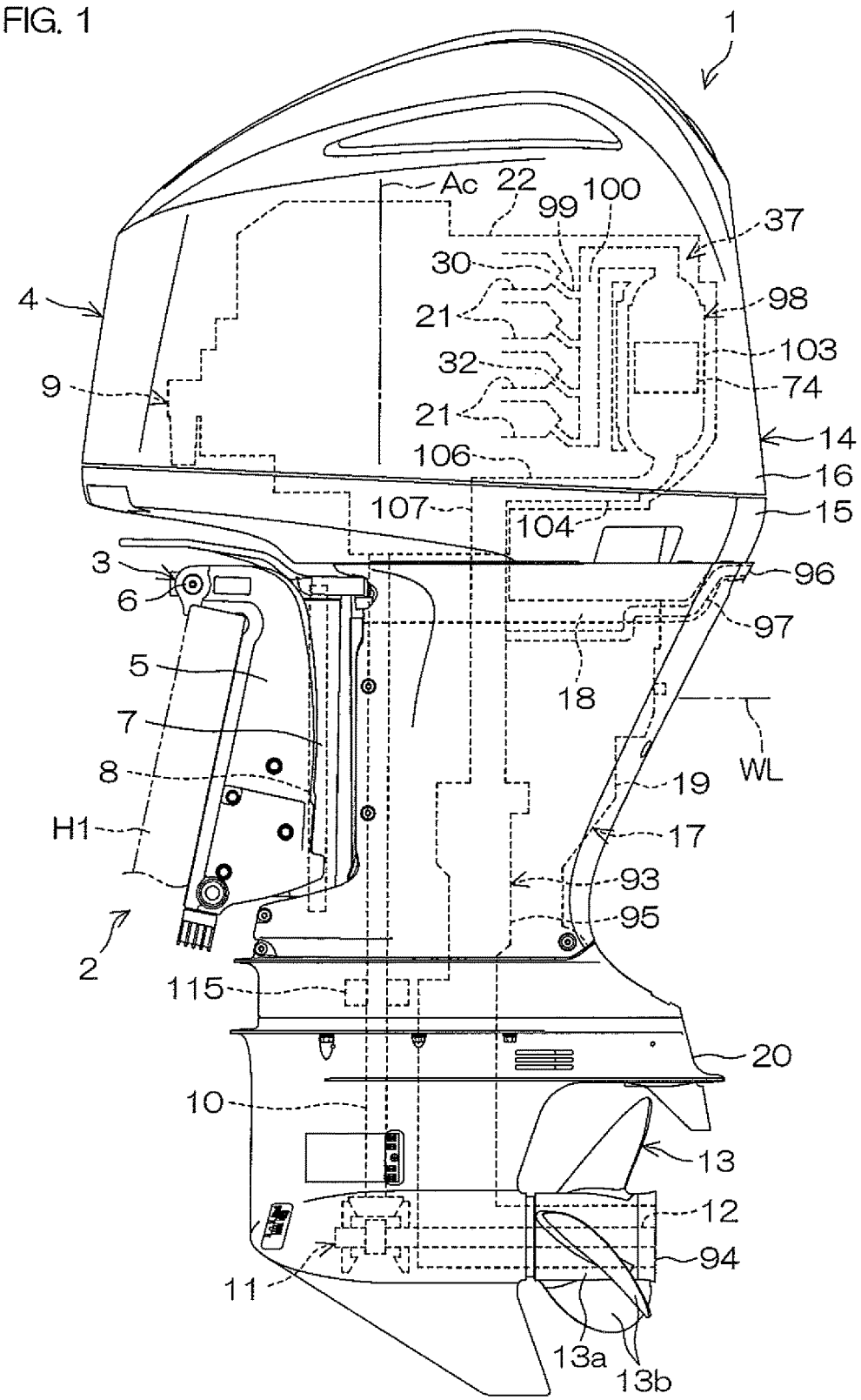
FIG. 1 is a schematic side view of a vessel according to a first preferred embodiment of the present invention.

FIG. 1 is a schematic side view of a vessel according to a first preferred embodiment of the present invention. FIG.

Figure 2:
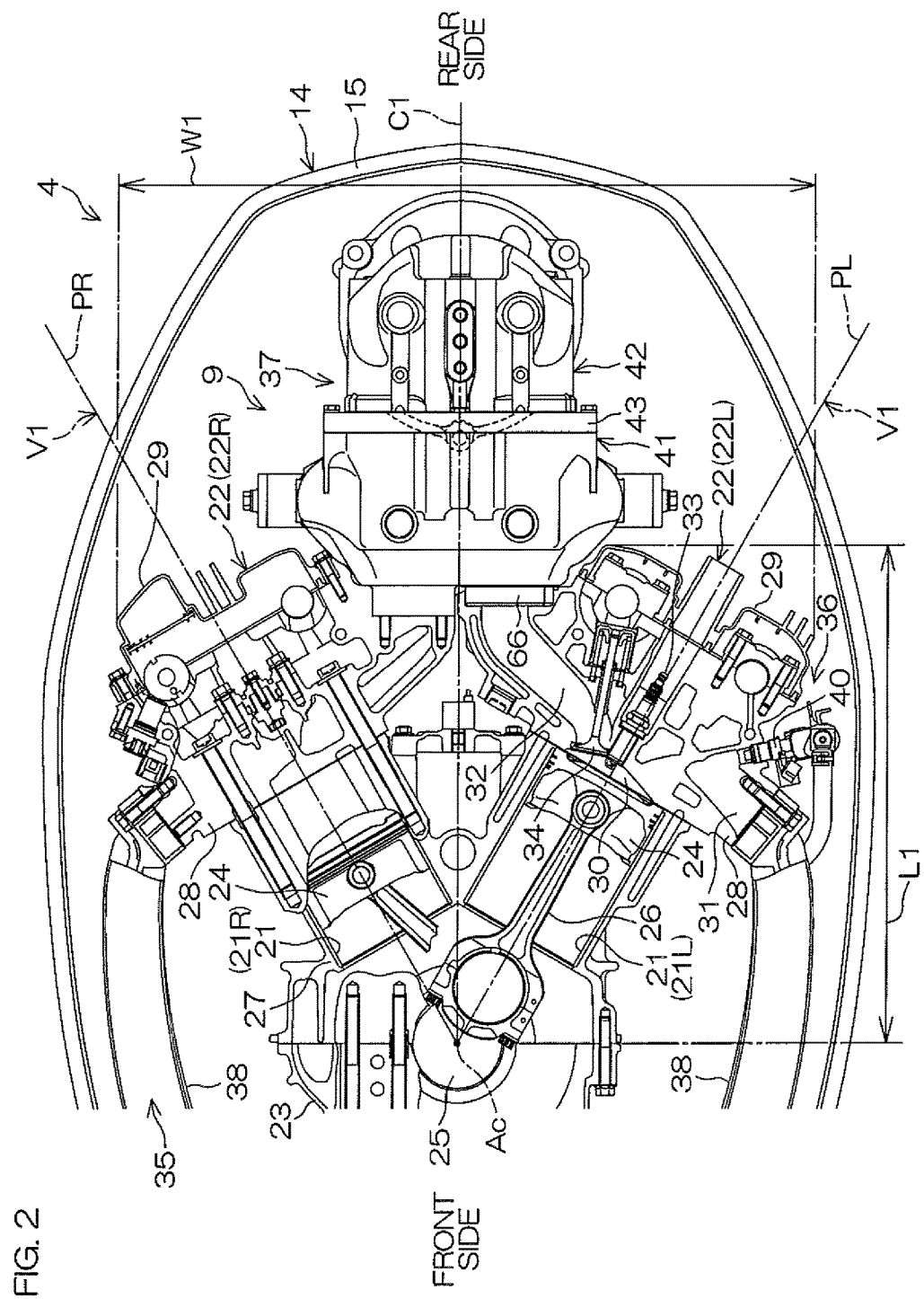
FIG. 2 is a partial sectional view of a portion of an engine as viewed from above.
Figure 3:
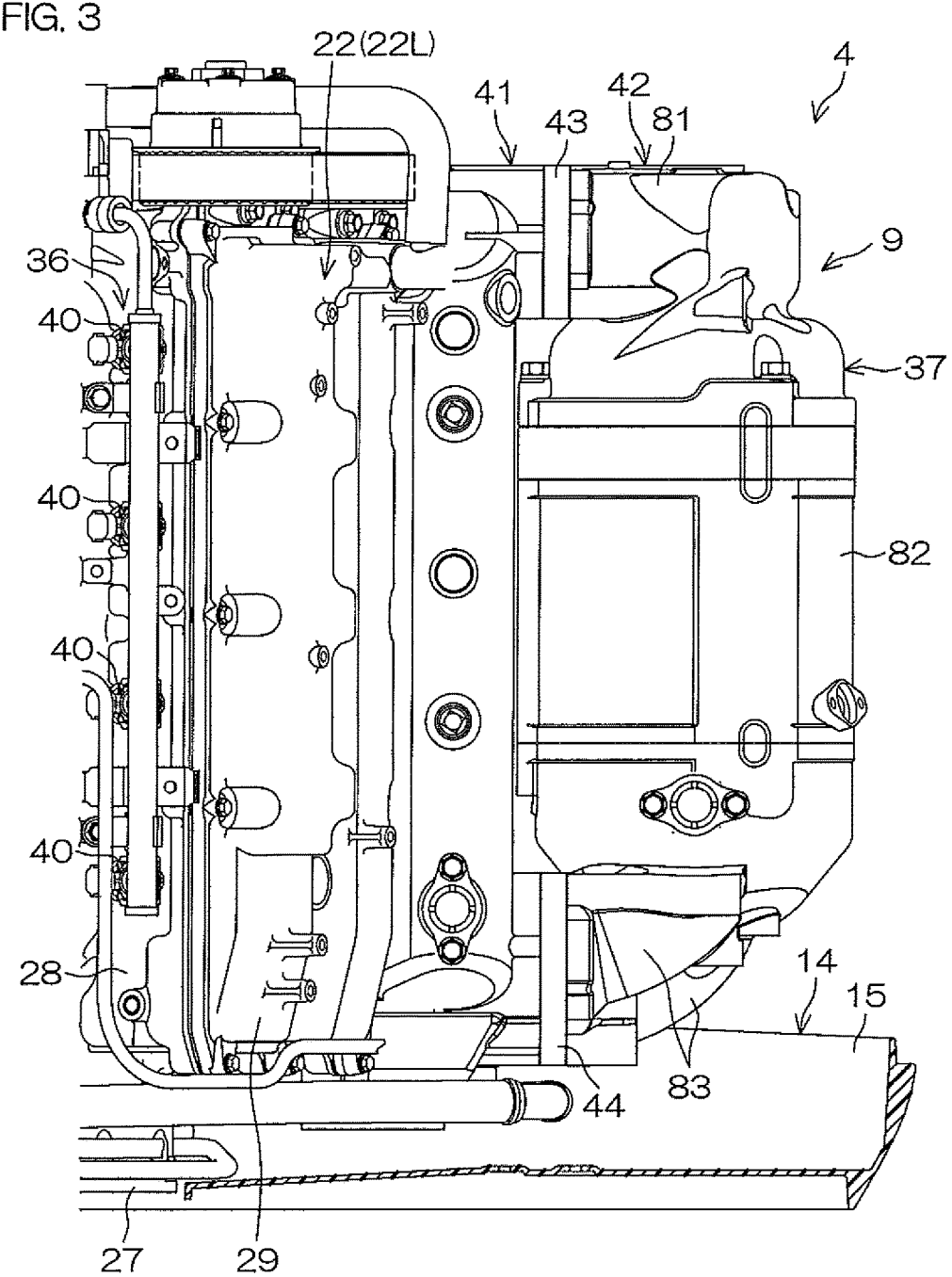
FIG. 3 is a side view of a rear portion of the engine.
Figure 4:
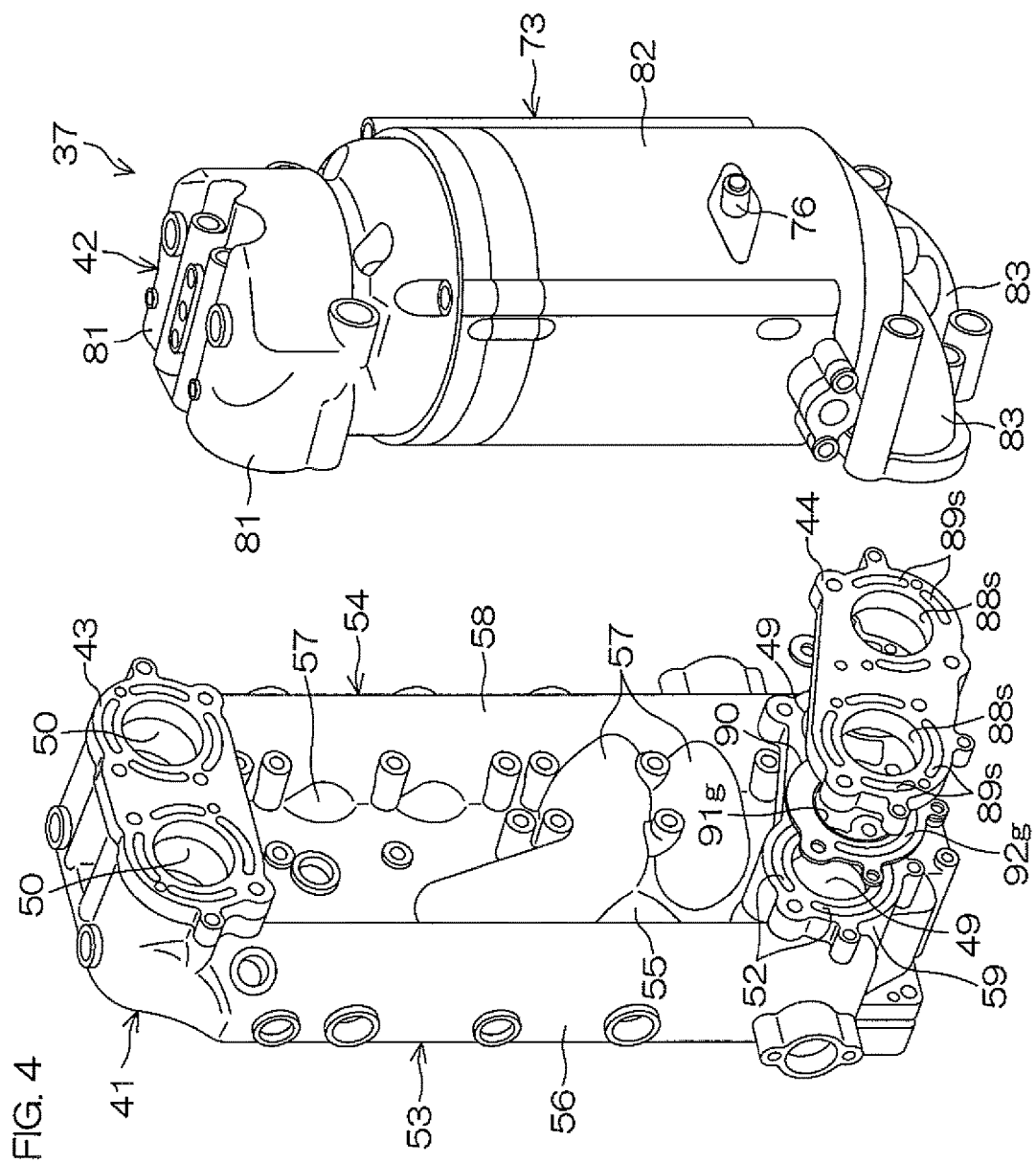
FIG. 4 is an exploded perspective view of an exhaust pipe and a catalytic unit.

2 is a partial sectional view of a portion of the engine as viewed from above. FIG. 3 is a side view of a rear portion of the engine. FIG. 4 is an exploded perspective view of an exhaust pipe and a catalytic unit. In FIG. 2, the hatching that indicates a cross-section is omitted. The cross-sections of two cylinder banks 22 shown in FIG. 2 preferably differ in height at the right side and the left side of a center C1 (a vertical plane passing through the crank axis Ac and orthogonal or substantially orthogonal to the right/left direction) of the outboard motor 4.

As shown in FIG. 1, the vessel 1 includes a hull H1 that floats on a water surface and a vessel propulsion apparatus 2 that propels the hull H1. The vessel propulsion apparatus 2 includes a suspension device 3, mountable to a rear portion (stern) of the hull H1, and an outboard motor 4 coupled to the suspension device 3.

As shown in FIG. 1, the suspension device 3 includes a pair of right and left clamp brackets 5 to be mounted on the hull H1, a tilting shaft 6 supported by the pair of clamp brackets 5 extending in the right/left direction, and a swivel bracket 7 mounted on the tilting shaft 6. The suspension device 3 further includes a steering shaft 8 supported by the swivel bracket 7 extending in the up/down direction.

As shown in FIG. 1, the outboard motor 4 is mounted on the steering shaft 8. The steering shaft 8 is supported by the swivel bracket 7 in a manner enabling rotation around a steering axis (center line of the steering shaft 8) extending in the up/down direction. The swivel bracket 7 is supported by the clamp brackets 5 via the tilting shaft 6. The swivel bracket 7 is rotatable around a tilt axis (center line of the tilting shaft 6) extending in the right/left direction with respect to the clamp brackets 5. The outboard motor 4 is rotatable to the right and left with respect to the suspension device 3 and is rotatable up and down with respect to the suspension device 3. The outboard motor 4 is thus rotatable to the right and left with respect to the hull H1 and is rotatable up and down with respect to the hull H1.

As shown in FIG. 1, the outboard motor 4 includes an engine 9 that generates power that rotates a propeller 13 and a power transmission device that transmits the power of the engine 9 to the propeller 13. The power transmission device includes a driveshaft 10 coupled to the engine 9, a forward/reverse switching mechanism 11 coupled to the driveshaft 10, and a propeller shaft 12 coupled to the forward/reverse switching mechanism 11. The outboard motor 4 further includes an engine cover 14 covering the engine 9 and a casing 17 housing the power transmission device.

As shown in FIG. 1, the engine cover 14 houses the engine 9. The engine cover 14 includes a cup-shaped bottom cover 15 that is upwardly open and a cup-shaped top cover 16 that is downwardly open. The top cover 16 is detachably mounted on the bottom cover 15. The opening portion of the top cover 16 is vertically overlapped with the opening portion of the bottom cover 15 via a seal (not shown). The bottom cover 15 is mounted on the casing 17 (specifically, an exhaust guide 18 to be described below). As shown in FIG. 3, a bottom portion of the bottom cover 15 is provided with an opening that penetrates through the bottom portion and a portion (cylinder bodies 27 to be described below) of the engine 9 is disposed in the opening at the bottom portion.

As shown in FIG. 1, the casing 17 includes an exhaust guide 18 disposed below the engine 9, an upper case 19 disposed below the exhaust guide 18, and a lower case 20 disposed below the upper case 19. The engine 9 is mounted on the exhaust guide 18. The engine 9 is disposed higher than the steering shaft 8. The exhaust guide 18 that serves as an engine supporting member supports the engine 9 with the rotational axis (crank axis Ac) of the engine 9 having a vertical attitude.

As shown in FIG. 1, the engine 9 is disposed above the driveshaft 10. The driveshaft 10 extends in the up/down direction inside the casing 17. A center line of the driveshaft 10 may be disposed on the rotational axis of the engine 9 or may be shifted with respect to the rotational axis of the engine 9. An upper end portion of the driveshaft 10 is coupled to the engine 9 and a lower end portion of the driveshaft 10 is coupled to a front end portion of the propeller shaft 12 via the forward/reverse switching mechanism 11. The propeller shaft 12 extends in the front/rear direction inside the casing 17. A rear end portion of the propeller shaft 12 projects to the rear from the casing 17. The propeller 13 is detachably mounted on the rear end portion of the propeller shaft 12. The propeller 13 includes an outer cylinder 13a surrounding the propeller shaft 12 around a center line of the propeller shaft 12 and a plurality of blades 13b extending outward from the outer cylinder 13a. The outer cylinder 13a and the blades 13b rotate together with the propeller shaft 12 around a propeller axis (center line of the propeller shaft 12).

The engine 9 is preferably an internal combustion engine. The engine 9 rotates in a fixed rotation direction. The rotation of the engine 9 is transmitted to the propeller 13 by the power transmission device (the driveshaft 10, the forward/reverse switching mechanism 11, and the propeller shaft 12). The propeller 13 is thus caused to rotate together with the propeller shaft 12 and a thrust that propels the vessel 1 forward or in reverse is generated. Also, the direction of the rotation transmitted from the driveshaft 10 to the propeller shaft 12 is switched by the forward/reverse switching mechanism 11. The rotation direction of the propeller 13 and the propeller shaft 12 is thus switched between a forward rotation direction (clockwise direction when the propeller 13 is viewed from the rear) and a reverse rotation direction (direction of rotation opposite to the forward rotation direction). The direction of thrust is thus switched.

As shown in FIG. 2, the engine 9 is, for example, a V-type eight-cylinder four-cycle engine. The engine 9 includes two cylinder banks 22 provided with a plurality of cylinders 21 and a crankcase 23 mounted on the respective cylinder banks 22. The engine 9 further includes a plurality of pistons 24 respectively disposed inside the plurality of cylinders 21, a crankshaft 25 rotatable around the crank axis Ac extending in the up/down direction, and a plurality of connecting rods 26 coupling the plurality of pistons 24 respectively to the crankshaft 25.

As shown in FIG. 2, the two cylinder banks 22 are disposed along V-shaped lines V1 that are open rearward in a plan view. The two cylinder banks 22 are disposed at the right and left sides of the center C1 of the outboard motor 4. Center lines of the four cylinders 21 provided in the cylinder bank 22 at the left side are disposed in a first plane PL that intersects the crank axis Ac. Center lines of the four cylinders 21 provided at the cylinder bank 22 at the right side are disposed in a second plane PR that intersects the crank axis Ac. The first plane PL and the second plane PR are symmetrical with respect to the center C1 of the outboard motor 4 and are disposed in a V-like shape in a plan view. The V-shaped lines V1 are defined by the first plane PL and the second plane PR. The V-shaped lines V1 extend rearward from the crank axis Ac.

As shown in FIG. 2, the two cylinder banks 22 include cylinder bodies 27 of a rearwardly opened V-shape in a plan view, two cylinder heads 28 respectively mounted on the two rear end portions of the cylinder bodies 27, and two head covers 29 respectively mounted on the two cylinder heads 28.

As shown in FIG. 2, the cylinder bodies 27 extend along the V-shaped lines V1 in a plan view. Together with the two cylinder heads 28, the cylinder bodies 27 define the plurality of cylinders 21. The two cylinder heads 28 are disposed behind the cylinder bodies 27 and the crankcase 23 is disposed in front of the cylinder bodies 27. The crankcase 23 is mounted on a front end portion of the cylinder bodies 27. The crankshaft 25 is housed in the interiors of the crankcase 23 and the cylinder bodies 27.

As shown in FIG. 2, the two cylinder heads 28 include a plurality of combustion chambers 30 respectively corresponding to the plurality of cylinders 21, a plurality of intake ports 31 supplying air into the plurality of combustion chambers 30, and a plurality of exhaust ports 32 discharging exhaust generated in the plurality of combustion chambers 30. The engine 9 includes a plurality of spark plugs 33 causing combustion of a mixed gas of air and fuel inside the plurality of combustion chambers 30, a plurality of intake valves opening and closing the plurality of intake ports 31, a plurality of exhaust valves 34 opening and closing the plurality of exhaust ports 32, and a valve mechanism that moves the plurality of intake valves and the plurality of exhaust valves 34.

As shown in FIG. 2, a region between the V-shaped lines V1 in the right/left direction is the inner side of the V-shaped lines V1 and a region at the right and left of the V-shaped lines V1 is the outer side of the V-shaped lines V1. The intake ports 31 are disposed at the outer side of the V-shaped lines V1 and the exhaust ports 32 are disposed at the inner side of the V-shaped lines V1. The plurality of intake ports 31 are respectively connected to the plurality of combustion chambers 30, and the plurality of exhaust ports 32 are respectively connected to the plurality of combustion chambers 30. Two exhaust ports 32 are preferably provided for each cylinder 21 (see FIG. 15B). The number of exhaust ports 32 corresponding to the same cylinder 21 is not restricted to two and may be one, for example.

As shown in FIG. 2, the engine 9 includes an intake device 35 supplying air to the plurality of combustion chambers 30, a fuel supplying device 36 supplying fuel to the plurality of combustion chambers 30, and an exhaust device 37 discharging the exhaust generated in the plurality of combustion chambers 30. The intake device 35, the fuel supplying device 36, and the exhaust device 37 are mounted on an engine main body that includes the cylinder banks 22 and the crankcase 23.

As shown in FIG. 2, the intake device 35 includes an intake manifold 38 supplying air to the plurality of combustion chambers 30 via the plurality of intake ports 31 and throttle valves adjusting the flow rates of air supplied from the intake manifold 38 to the plurality of combustion chambers 30. The intake manifold 38 is mounted on the cylinder heads 28 and the interior of the intake manifold 38 is connected to the respective intake ports 31. The throttle valves are mounted on the intake manifold 38. The throttle valves correspond to the respective combustion chambers 30. The intake manifold 38 and the throttle valves are disposed at the outer side of the V-shaped lines V1.

As shown in FIG. 2, the fuel supplying device 36 includes a plurality of fuel injectors 40 supplying fuel to the plurality of combustion chambers 30. The fuel injectors 40 are mounted respectively according to the combustion chambers 30. Each fuel injector 40 is mounted on a cylinder head 28.

A fuel outlet of the fuel injector 40 that injects fuel is disposed inside an intake port 31. The fuel outlet of the fuel injector 40 is not restricted to being disposed inside the intake port 31 and may be disposed inside a combustion chamber 30 instead. That is, the engine 9 is not restricted to being a port-injection engine and may instead be a direct-injection engine.

As shown in FIG. 2, the exhaust device 37 includes an exhaust pipe 41 guiding the exhaust discharged from the plurality of combustion chambers 30 via the plurality of exhaust ports 32 and a catalytic unit 42 that purifies the exhaust discharged from the exhaust pipe 41. As shown in FIG. 4, the exhaust device 37 further includes an upper spacer 43 and a lower spacer 44 interposed between the exhaust pipe 41 and the catalytic unit 42. The catalytic unit 42 is disposed behind the exhaust pipe 41 and is mounted on the exhaust pipe 41 via the upper spacer 43 and the lower spacer 44. As shown in FIG. 2, the exhaust pipe 41 is disposed behind the two cylinder banks 22 and is mounted on the two cylinder heads 28. The exhaust pipe 41 and the catalytic unit 42 are disposed at the inner side of the V-shaped lines V1. The exhaust pipe 41 and the catalytic unit 42 overlap with the center C1 of the outboard motor 4 that bisects the V-shaped lines V1 in a plan view.

As shown in FIG. 3, the exhaust pipe 41 and the catalytic unit 42 are disposed higher than the bottom cover 15. The exhaust pipe 41 and the catalytic unit 42 are disposed further to the front than to a rear end of the bottom cover 15. As shown in FIG. 2, the exhaust pipe 41 is shorter in the front/rear direction than the catalytic unit 42. The catalytic unit 42 is shorter in the front/rear direction than the two cylinder banks 22 (see the "front/rear direction length L1 of the cylinder banks 22" in FIG. 2). The exhaust pipe 41 is thus shorter in the front/rear direction than the two cylinder banks 22. Also, the width (length in the right/left direction) of the catalytic unit 42 is shorter than the width of the exhaust pipe 41. The width of the exhaust pipe 41 is shorter than the width W1 of the two cylinder banks 22. The width of the catalytic unit 42 is thus shorter than the width of the two cylinder banks 22. The front/rear direction length L1 of the cylinder banks 22 is the front/rear direction length from the front end (foremost portion) of the cylinder banks 22 to the rear end (rearmost portion) of the cylinder banks 22. Also, the width W1 of the two cylinder banks 22 is the right/left direction length from the right end (rightmost portion) of the two cylinder banks 22 to the left end (leftmost portion) of the two cylinder banks 22.

Each combustion chamber 30 is connected to an internal space of the exhaust pipe 41 via the corresponding exhaust port 32. As shall be described below, the exhaust pipe 41 includes an internal passage guiding the exhaust discharged from the combustion chambers 30 to the catalytic unit 42 and an internal passage guiding the exhaust discharged from the catalytic unit 42 to the two cylinder banks 22. The exhaust generated in each combustion chamber 30 is thus discharged into the interior of the exhaust pipe 41 via the corresponding exhaust port 32 and is discharged from the interior of the exhaust pipe 41 into the interior of the catalytic unit 42. The exhaust discharged into the interior of the catalytic unit 42 is purified by the catalytic unit 42. The purified exhaust is discharged from the interior of the catalytic unit 42 to the interior of the exhaust pipe 41 and discharged from the interior of the exhaust pipe 41 to the interiors of the two cylinder banks 22.

In the following description, the "cylinder bank 22 at the left side with respect to the center C1 of the outboard motor 4" may be referred to as the "first cylinder bank 22L" and the "cylinder bank 22 at the right side with respect to the center C1 of the outboard motor 4" may be referred to as the "second cylinder bank 22R." Also, the "cylinders 21 corresponding to the first cylinder bank 22L" and the "exhaust ports 32 corresponding to the first cylinder bank 22L" may be referred to respectively as the "first cylinders 21L" and the "first exhaust ports 32L," and the "cylinders 21 corresponding to the second cylinder bank 22R" and the "exhaust ports 32 corresponding to the second cylinder bank 22R" may be referred to respectively as the "second cylinders 21R" and the "second exhaust ports 32R." The first cylinder bank 22L thus includes four first cylinders 21L and four pairs of first exhaust ports 32L (eight first exhaust ports 32L) and the second cylinder bank 22R includes four second cylinders 21R and four pairs of second exhaust ports 32R (eight second exhaust ports 32R).

Figure 5:
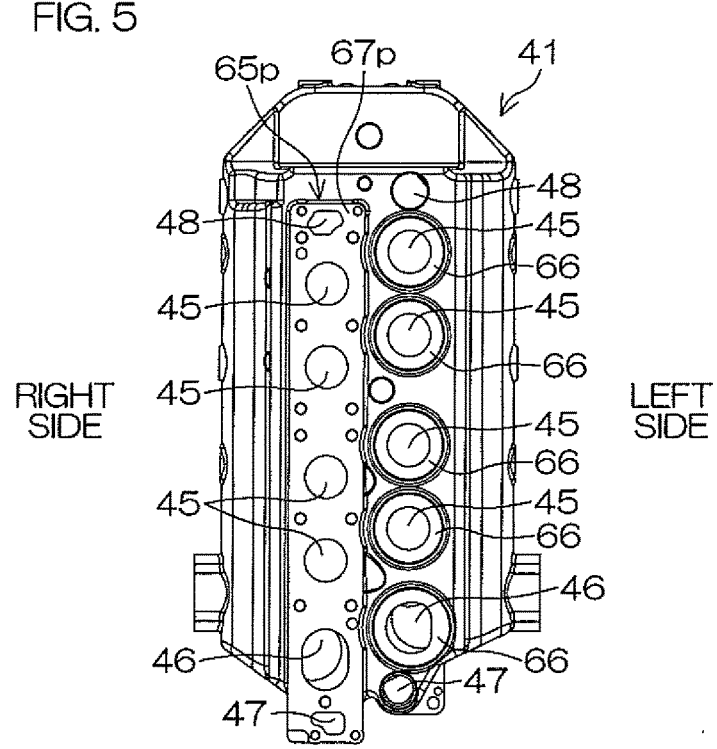
FIG. 5 is a front view of the exhaust pipe.
Figure 6:
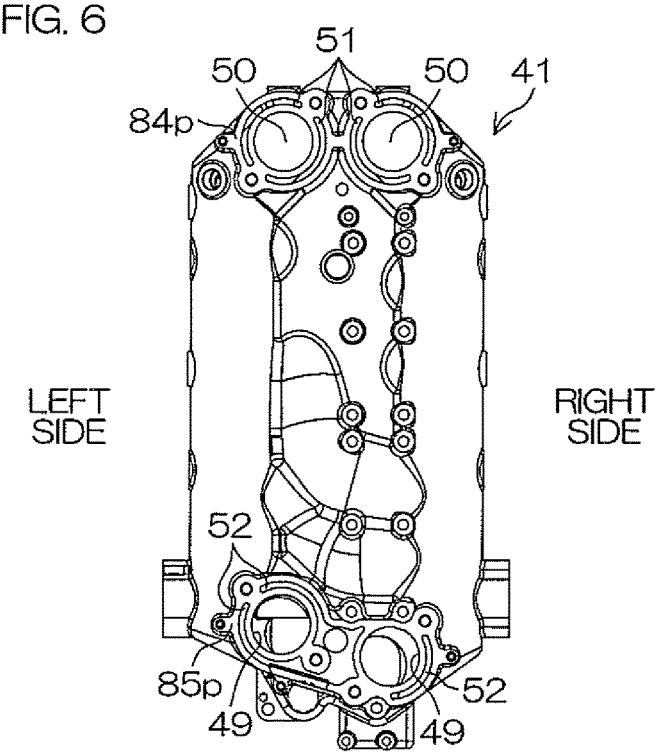
FIG. 6 is a rear view of the exhaust pipe.
Figure 7A:
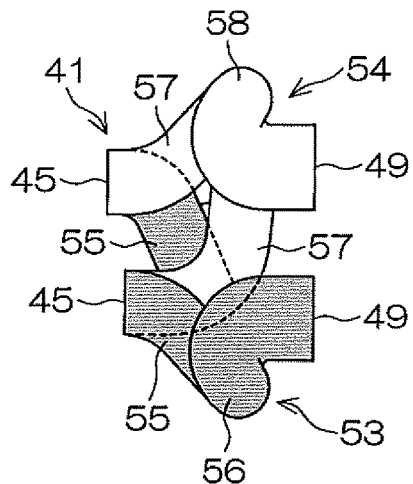
FIG. 7A is a plan view of an internal structure of the exhaust pipe.
Figure 7B:
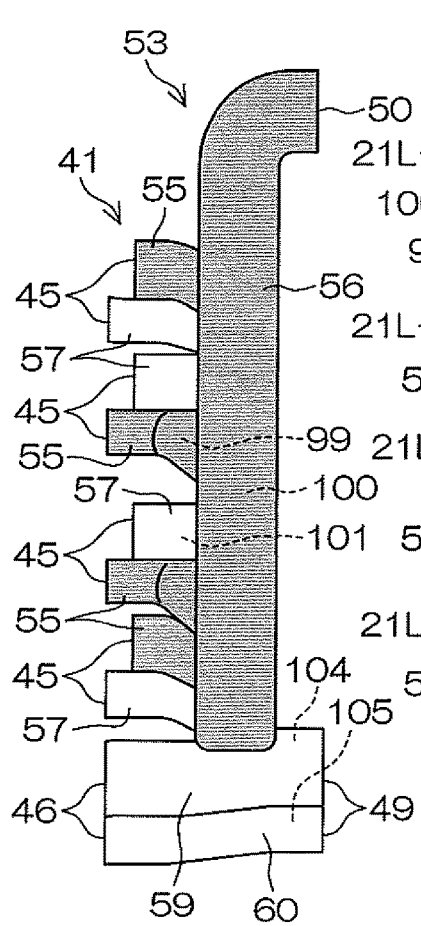
FIG. 7B is a side view of the internal structure of the exhaust pipe.
Figure 7C:
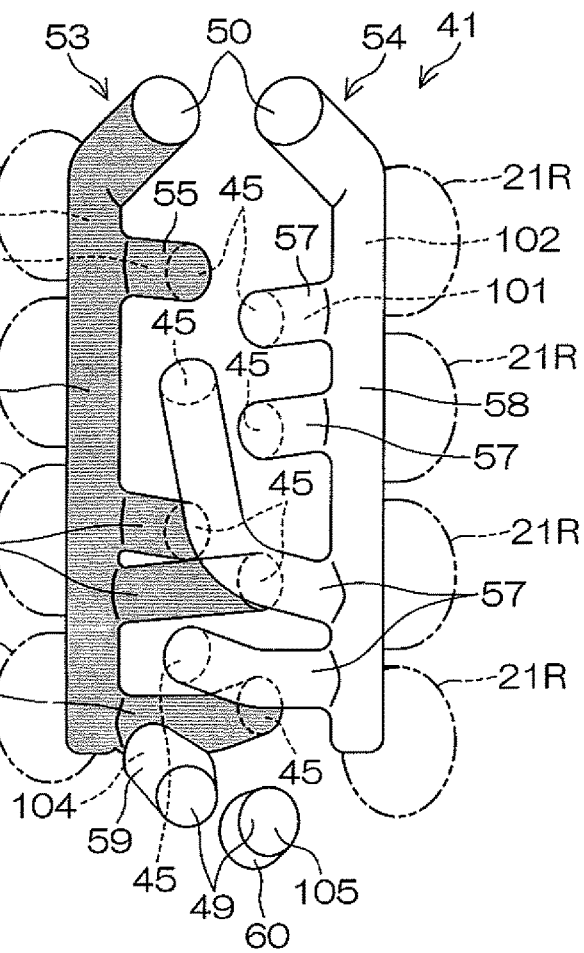
FIG. 7C is a rear view of the internal structure of the exhaust pipe.

FIG. 5 is a front view of the exhaust pipe. FIG. 6 is a rear view of the exhaust pipe. FIG. 7A, FIG. 7B, and FIG. 7C are, respectively, a plan view, a side view, and a rear view of an internal structure of the exhaust pipe. In FIG. 7A to FIG. 7C, a first exhaust manifold 53 provided in the exhaust pipe 41 is indicated in gray.

As shown in FIG. 5, the exhaust pipe 41 includes eight front exhaust inlets 45 opening at the outer surface of the exhaust pipe 41 and two front exhaust outlets 46 opening at the outer surface of the exhaust pipe 41. The exhaust pipe 41 further includes two front cooling water inlets 47 opening at the outer surface of the exhaust pipe 41 and two front cooling water outlets 48 opening at the outer surface of the exhaust pipe 41.

As shown in FIG. 5, the front exhaust inlets 45, the front exhaust outlets 46, the front cooling water inlets 47, and the front cooling water outlets 48 define two columns extending in the up/down direction. Each column preferably includes four front exhaust inlets 45, one front exhaust outlet 46, one front cooling water inlet 47, and one front cooling water outlet 48. The front exhaust outlet 46 is disposed below the front exhaust inlets 45 of the same column, and the front cooling water inlet 47 is disposed below the front exhaust outlet 46 of the same column. The front cooling water outlet 48 is disposed above the front exhaust inlets 45 of the same column. The two columns are mutually parallel or substantially parallel and are spaced apart by an interval in the right/left direction. The front exhaust inlets 45, the front exhaust outlet 46, the front cooling water inlet 47, and the front cooling water outlet 48 of the left column in FIG. 5 open at the same plane. Also, the front exhaust inlets 45 and the front exhaust outlet 46 of the right column in FIG. 5 open at the same plane.

As shown in FIG. 6, the exhaust pipe 41 includes two rear exhaust inlets 49 opening at the outer surface of the exhaust pipe 41 and two rear exhaust outlets 50 opening at the outer surface of the exhaust pipe 41. The exhaust pipe 41 further includes rear cooling water inlets 51 opening at the outer surface of the exhaust pipe 41 and rear cooling water outlets 52 opening at the outer surface of the exhaust pipe 41.

As shown in FIG. 6, the rear exhaust inlets 49 are disposed lower than the rear exhaust outlets 50. The two rear exhaust inlets 49 are aligned in the right/left direction, and the two rear exhaust outlets 50 are aligned in the right/left direction at a height higher than the rear exhaust inlets 49. The two rear exhaust inlets 49 are respectively disposed below the two rear exhaust outlets 50. The rear cooling water inlets 51 are disposed at a periphery of the two rear exhaust outlets 50, and the rear cooling water outlets 52 are disposed at a periphery of the two rear exhaust inlets 49. The rear cooling water inlets 51 and the rear cooling water outlets 52 respectively include a plurality of openings. The rear cooling water inlets 51 and the rear exhaust outlets 50 open at the same plane, and the rear cooling water outlets 52 and the rear exhaust inlets 49 open at the same plane.

As shown in FIG. 7A to FIG. 7C, the exhaust pipe 41 includes the first exhaust manifold 53 extending from four of the front exhaust inlets 45 to one of the rear exhaust outlets 50 and a second exhaust manifold 54 extending from the other four front exhaust inlets 45 to the other rear exhaust outlet 50. The exhaust pipe 41 further includes a first relay pipe 59 extending from one of the front exhaust outlets 46 to one of the rear exhaust inlets 49 and a second relay pipe 60 extending from the other front exhaust outlet 46 to the other rear exhaust inlet 49.

As shown in FIG. 7A to FIG. 7C, the first exhaust manifold 53 includes four first branch pipes 55 and one first collecting pipe 56. Similarly, the second exhaust manifold 54 includes four second branch pipes 57 and one second collecting pipe 58. The first branch pipes 55, the first collecting pipe 56, the second branch pipes 57, the second collecting pipe 58, the first relay pipe 59, and the second relay pipe 60 are provided in the exhaust pipe 41. The pipes defining the exhaust pipe 41 are preferably integral and unitary. The first branch pipes 55, the first collecting pipe 56, the second branch pipes 57, the second collecting pipe 58, the first relay pipe 59, and the second relay pipe 60 are thus preferably integral and unitary.

As shown in FIG. 7A to FIG. 7C, the four first branch pipes 55 are respectively connected to four of the front exhaust inlets 45. The first branch pipes 55 extend from the first collecting pipe 56 to the front exhaust inlets 45. The first collecting pipe 56 connects each of the four first branch pipes 55 to a rear exhaust outlet 50. The first collecting pipe 56 is disposed behind the four first cylinders 21L. The first collecting pipe 56 extends in the up/down direction. The first collecting pipe 56 overlaps with the four first cylinders 21L in a rear view. The four first branch pipes 55 are connected to the first collecting pipe 56 at respectively different heights. The first relay pipe 59 and the second relay pipe 60 are disposed lower than the first branch pipes 55.

As with the first exhaust manifold 53, the four second branch pipes 57 of the second exhaust manifold are respectively connected to the other four front exhaust inlets 45. The second branch pipes 57 extend from the second collecting pipe 58 to the front exhaust inlets 45. The second collecting pipe 58 connects each of the four second branch pipes 57 to a rear exhaust outlet 50. The second collecting pipe 58 is disposed behind the four second cylinders 21R. The second collecting pipe 58 extends in the up/down direction. The four second branch pipes 57 are connected to the second collecting pipe 58 at respectively different heights. The first relay pipe 59 and the second relay pipe 60 are disposed lower than the second branch pipes 57.

As shown in FIG. 7A to FIG. 7C, the first collecting pipe 56 is a first rectilinear pipe that extends rectilinearly in the direction of alignment of the four first cylinders 21L. The first collecting pipe 56 extends from the height of the first cylinder 21L that is disposed uppermost among the four first cylinders 21L to the height of the first cylinder 21L that is disposed lowermost among the four first cylinders 21L. The first collecting pipe 56 overlaps, in a rear view, with the first cylinder 21L that is disposed uppermost among the four first cylinders 21L and overlaps, in a rear view, with the first cylinder 21L that is disposed lowermost among the four first cylinders 21L.

As shown in FIG. 7A to FIG. 7C, the second collecting pipe 58 is a second rectilinear pipe that extends rectilinearly in the direction of alignment of the four second cylinders 21R. The second collecting pipe 58 extends from the height of the second cylinder 21R that is disposed uppermost among the four second cylinders 21R to the height of the second cylinder 21R that is disposed lowermost among the four second cylinders 21R. The second collecting pipe 58 overlaps, in a rear view, with the second cylinder 21R that is disposed uppermost among the four second cylinders 21R and overlaps, in a rear view, with the second cylinder 21R that is disposed lowermost among the four second cylinders 21R.

Figure 9:
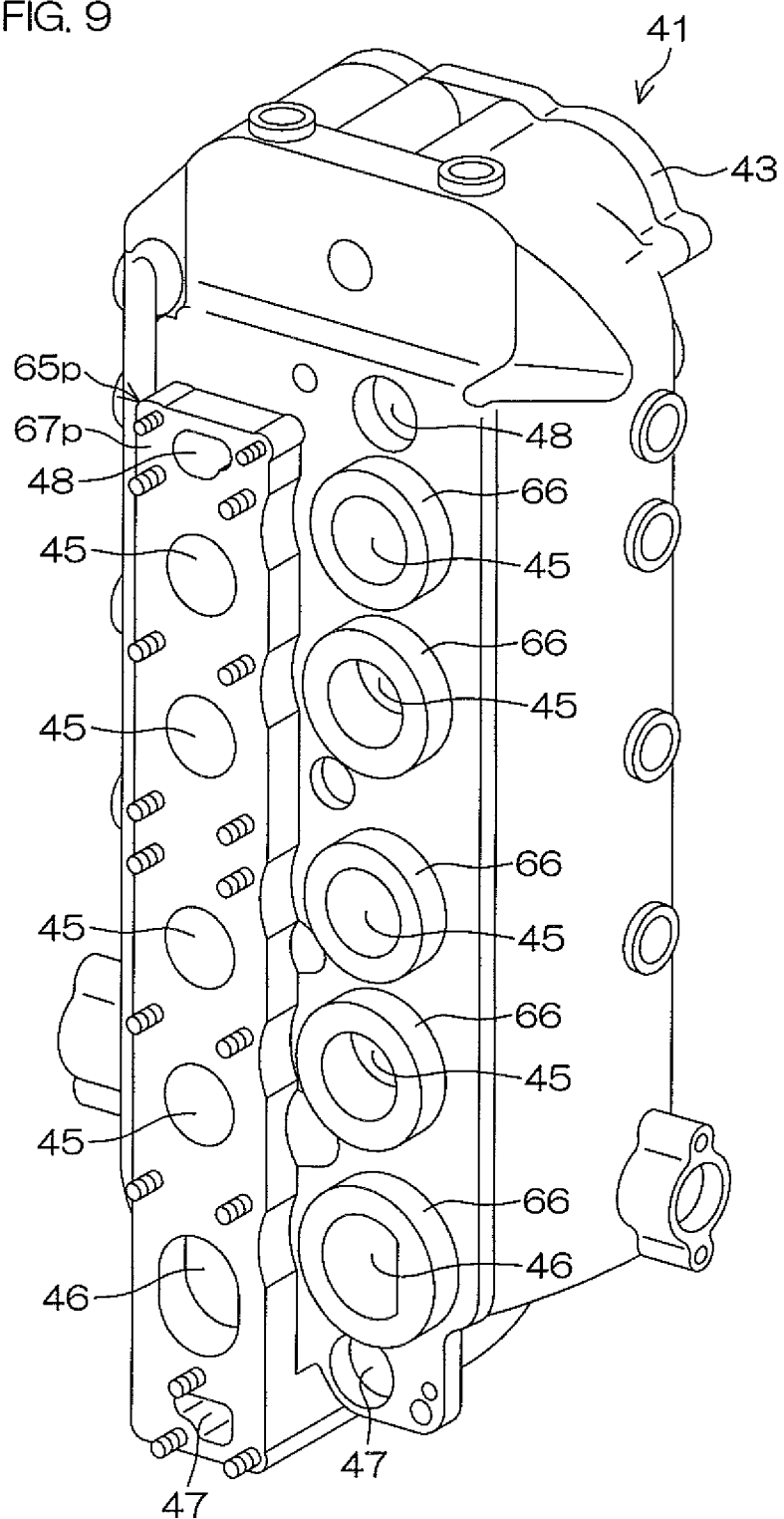
FIG. 9 is a perspective view of the front of the exhaust pipe as viewed from obliquely upward to the left.
Figure 10:
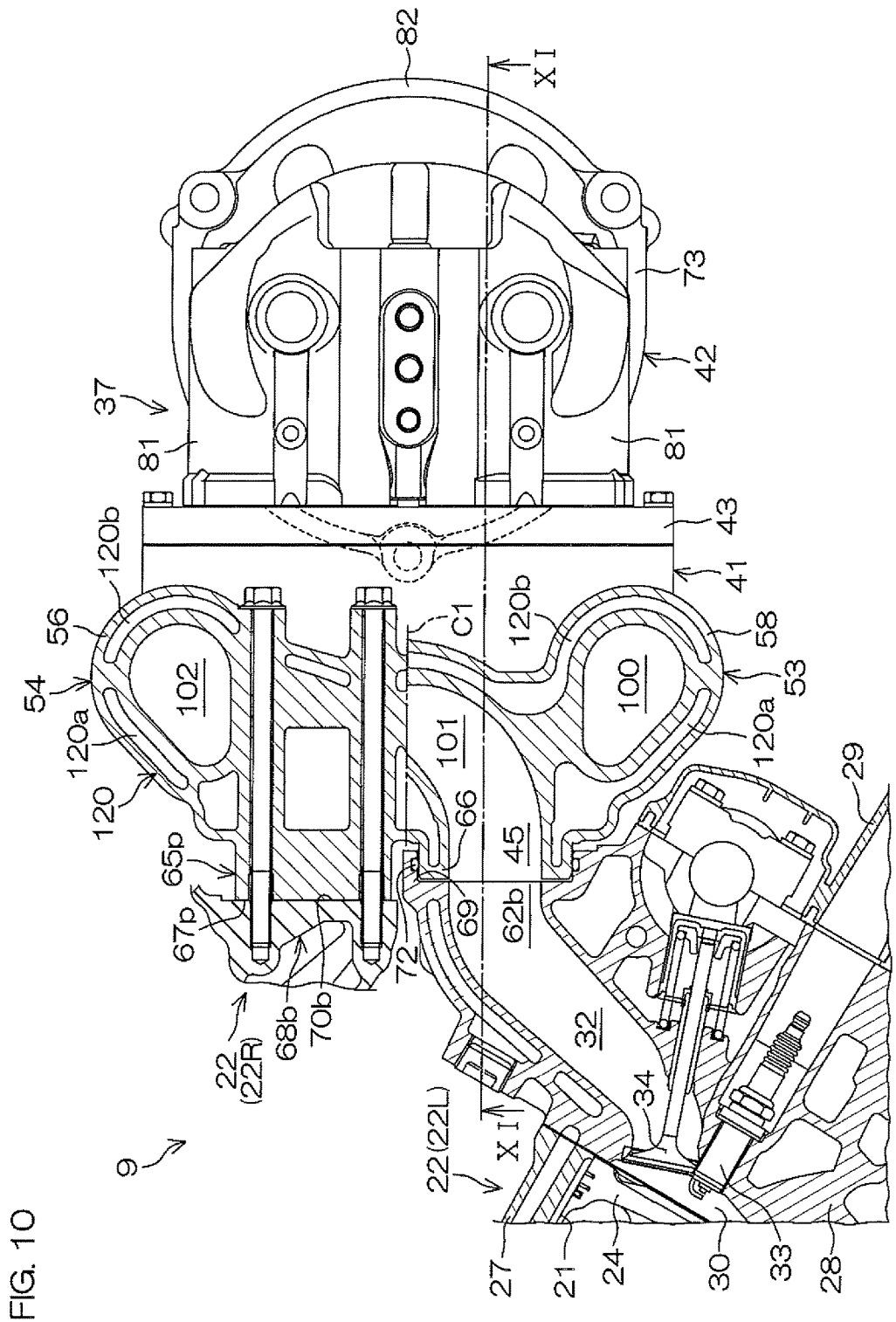
FIG. 10 is a partial sectional view of the integration of the exhaust pipe and the engine main body.
Figure 11:
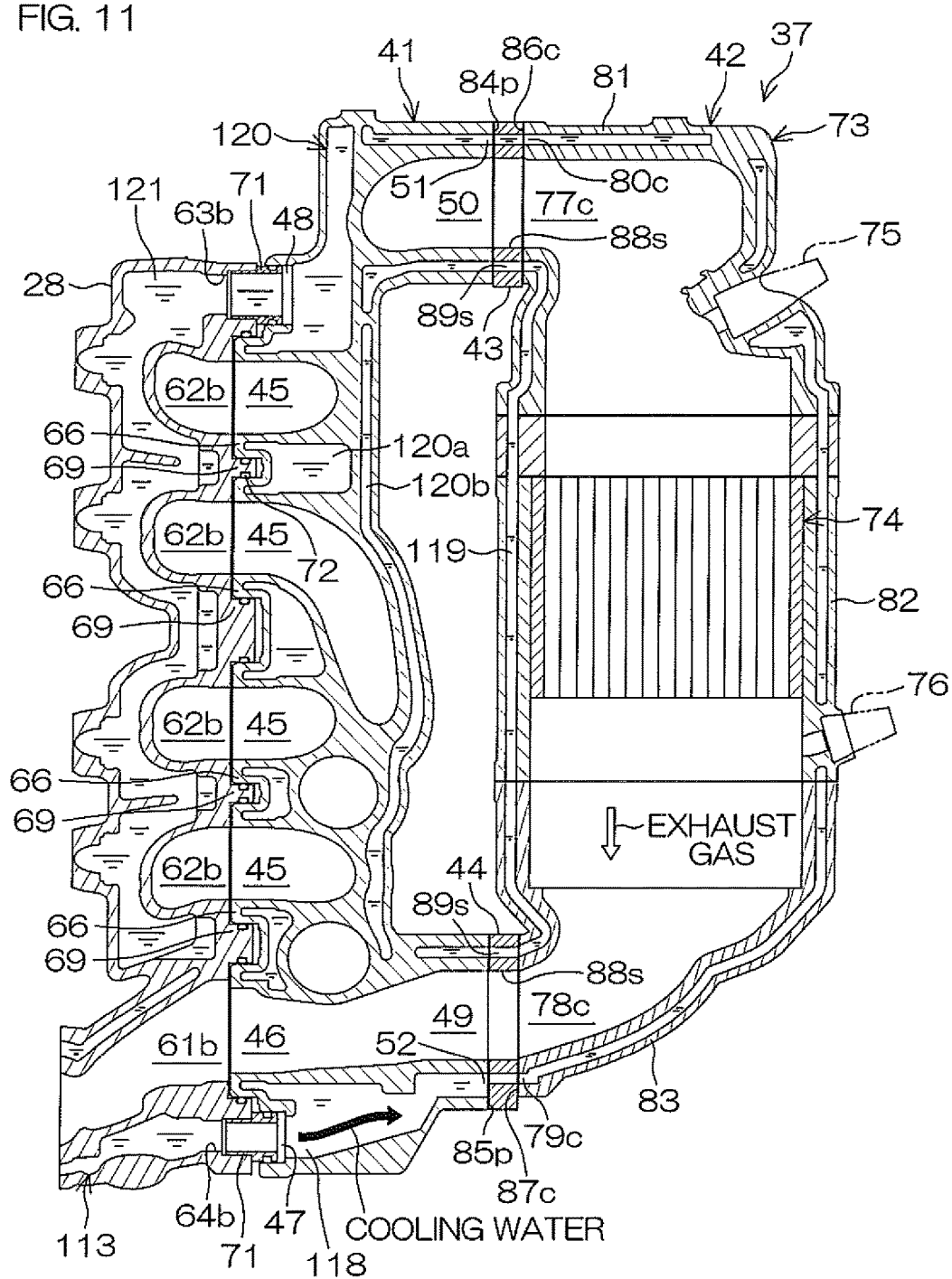
FIG. 11 is a longitudinal sectional view of the exhaust pipe and the catalytic unit as viewed in the direction of arrows XI shown in FIG. 10.

FIG. 8 is a rear view of the engine main body. FIG. 9 is a perspective view of the front of the exhaust pipe as viewed from obliquely upward to the left. FIG. 10 is a partial sectional view of the state of integration of the exhaust pipe and the engine main body. FIG. 11 is a longitudinal sectional view of the exhaust pipe and the catalytic unit as viewed in the direction of arrows XI shown in FIG. 10. The cross-sections of the exhaust pipe 41 shown in FIG. 10 differ in height at the right side and the left side of the center C1 of the outboard motor 4.

As shown in FIG. 8, the cylinder heads 28 include two exhaust inlets 61b that open at the outer surfaces of the cylinder heads 28 and eight exhaust outlets 62b that open at the outer surfaces of the cylinder heads 28. The cylinder heads 28 further include two cooling water inlets 63b that open at the outer surfaces of the cylinder heads 28 and two cooling water outlets 64b that open at the outer surfaces of the cylinder heads 28.

As shown in FIG. 8, the exhaust inlets 61b, the exhaust outlets 62b, the cooling water inlets 63b, and the cooling water outlets 64b define two columns extending in the up/down direction. Each column preferably includes one exhaust inlet 61b, four exhaust outlets 62b, one cooling water inlet 63b, and one cooling water outlet 64b. The exhaust outlets 62b are disposed above the exhaust inlet 61b of the same column, and the cooling water inlet 63b is disposed above the exhaust outlets 62b of the same column. The cooling water outlet 64b is disposed below the exhaust inlet 61b of the same column. The two columns are mutually parallel or substantially parallel and are spaced apart by an interval in the right/left direction. The exhaust inlet 61b, the exhaust outlets 62b, the cooling water inlet 63b, and the cooling water outlet 64b of the right column in FIG. 8 open at the same plane. Also, the exhaust inlet 61b and the exhaust outlets 62b of the left column in FIG. 8 open at the same plane.

As shown in FIG. 9, the exhaust pipe 41 includes a fixed portion 65p including a plurality of openings and five cylindrical insertion portions 66 including five openings provided with five cylindrical insertion portions 66 respectively. The fixed portion 65p includes a flat mounting surface 67p extending in the up/down direction. The front exhaust inlets 45, the front exhaust outlet 46, the front cooling water inlet 47, and the front cooling water outlet 48, included in one of the columns, open at the mounting surface 67p. The front exhaust inlets 45 and the front exhaust outlet 46, included in the other column, open at end surfaces of the five insertion portions 66. The five insertion portions 66 are aligned at intervals in the up/down direction.

As shown in FIG. 8, the two cylinder banks 22 include a fixed portion 68b including a plurality of openings and five supporting recesses 69 including five openings provided with five supporting recesses 69, respectively. The fixed portion 68b is provided at the second cylinder bank 22R and the supporting recesses 69 are provided at the first cylinder bank 22L. The fixed portion 68b includes a flat mounting surface 70b extending in the up/down direction. The exhaust inlet 61b, the exhaust outlets 62b, the cooling water inlet 63b, and the cooling water outlet 64b of one of the columns open at the mounting surface 70b. The exhaust inlet 61b and the exhaust outlets 62b of the other column open at bottom surfaces of the five supporting recesses 69. The five supporting recesses 69 are aligned at intervals in the up/down direction.

As shown in FIG. 10, the mounting surface 67p of the exhaust pipe 41 is disposed parallel or substantially parallel to the mounting surface 70b of the cylinder banks 22. The mounting surface 67p of the exhaust pipe 41 is in contact with the mounting surface 70b of the cylinder banks 22 via a gasket (not shown). The seven openings (the front exhaust inlets 45, the front exhaust outlet 46, the front cooling water inlet 47, and the front cooling water outlet 48) provided at the mounting surface 67p respectively face the seven openings (the exhaust inlet 61b, the exhaust outlets 62b, the cooling water inlet 63b, and the cooling water outlet 64b) provided at the mounting surface 70b. In this state, the fixed portion 65p is fixed to the fixed portion 68b preferably by a plurality of bolts, for example. The front exhaust inlets 45 and the exhaust outlets 62b are thus connected and the exhaust inlet 61b and the front exhaust outlet 46 are connected. Similarly, the front cooling water inlet 47 and the cooling water outlet 64b are connected and the cooling water inlet 63b and the front cooling water outlet 48 are connected.

Also as shown in FIG. 10, the five insertion portions 66 of the exhaust pipe 41 are respectively inserted in the five supporting recesses 69 of the cylinder head 28. The five openings (the front exhaust inlets 45 and the front exhaust outlet 46) provided in the five insertion portions 66 respectively face the five openings (the exhaust inlet 61b and the exhaust outlets 62b) provided in the five supporting recesses 69. The front exhaust inlets 45 and the exhaust outlets 62b are thus connected and the exhaust inlet 61b and the front exhaust outlet 46 are connected. As shown in FIG. 11, the front cooling water inlet 47 and the cooling water outlet 64b are connected via a cooling water pipe 71 inserted in the cylinder head 28 and the exhaust pipe 41, and the cooling water inlet 63b and the front cooling water outlet 48 are connected via a cooling water pipe 71 inserted in the cylinder head 28 and the exhaust pipe 41.

As shown in FIG. 10, the engine 9 includes a plurality of O-rings 72, each disposed between an outer peripheral surface of an insertion portion 66 and an inner peripheral surface of a supporting recess 69. A gap between the outer peripheral surface of the insertion portion 66 and the inner peripheral surface of the supporting recess 69 is sealed by the O-ring 72. The insertion portion 66 that is a floating portion is movable in an axial direction of the insertion portion 66 with respect to the supporting recess 69 in the state in which the gap between the insertion portion 66 and the supporting recess 69 is sealed. The relative positions of the insertion portion 66 and the supporting recess 69 change due to assembly errors of the engine 9 and thermal expansion of the engine 9. The insertion portion 66 and the supporting recess 69 are included in a floating mechanism that absorbs the assembly errors of the engine 9 and the thermal expansion of the engine 9.

Figure 12A:
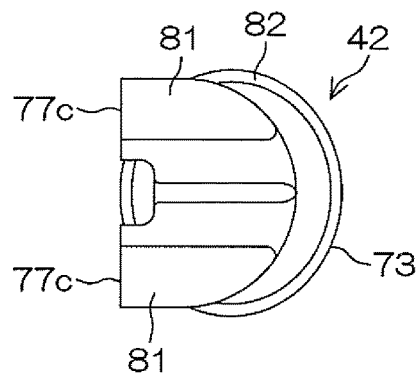
FIG. 12A is a plan view of an internal structure of the catalytic unit.
Figure 12B:
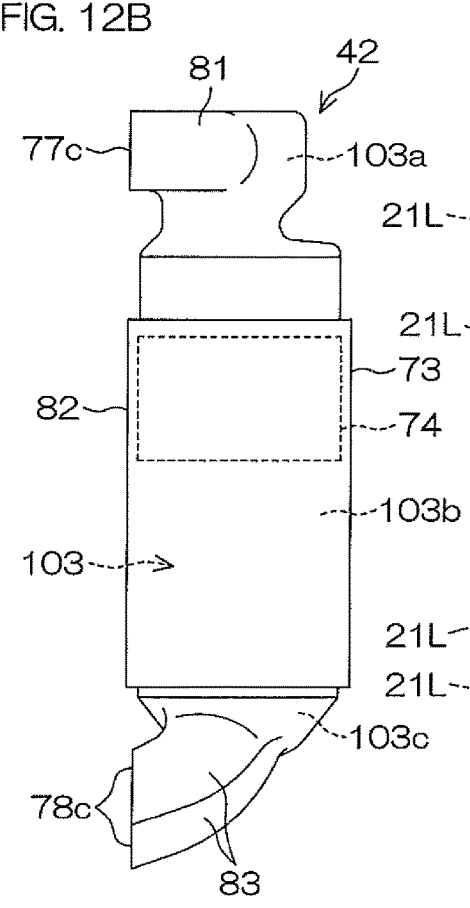
FIG. 12B is a side view of the internal structure of the catalytic unit.
Figure 12C:
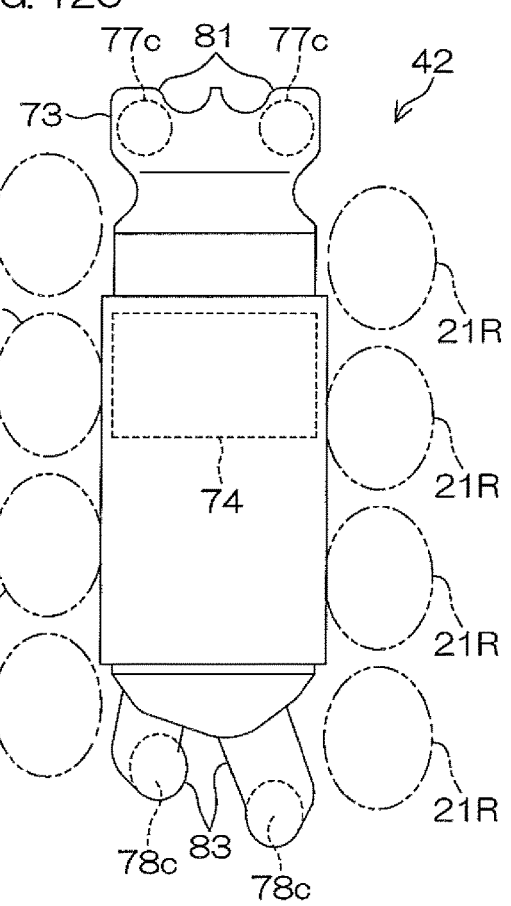
FIG. 12C is a rear view of the internal structure of the catalytic unit.
Figure 13:
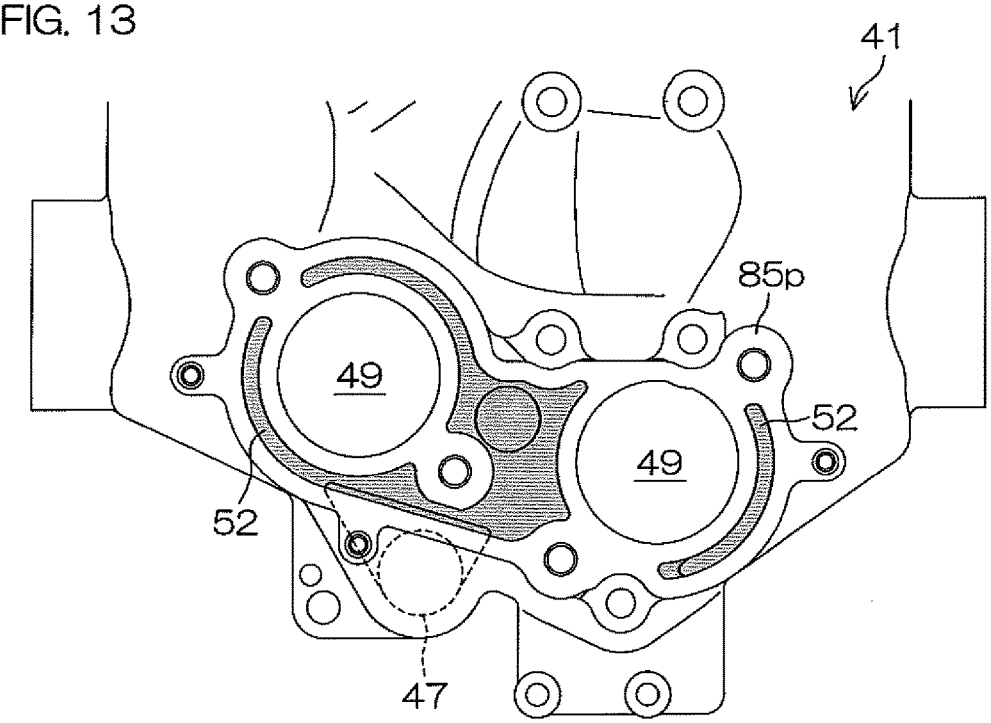
FIG. 13 is a rear view of a lower portion of the exhaust pipe.
Figure 14:
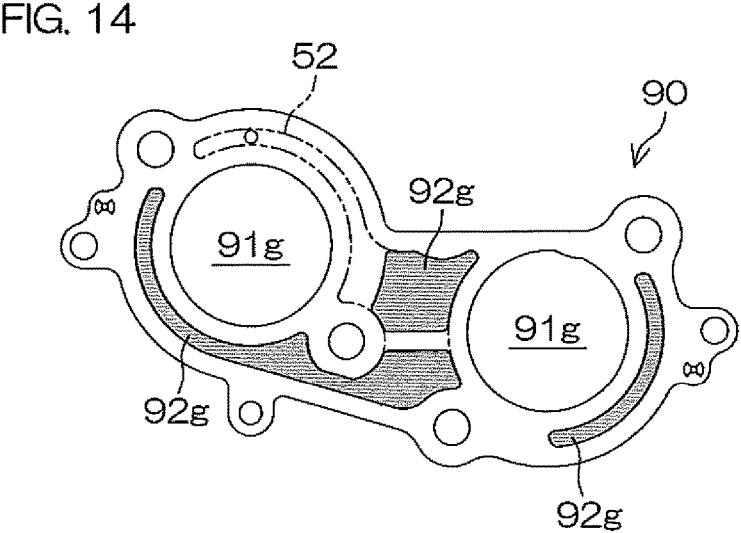
FIG. 14 is a rear view of a gasket disposed between the lower portion of the exhaust pipe and a lower portion of the catalytic unit.

FIG. 12A, FIG. 12B, and FIG. 12C are, respectively, a plan view, a side view, and a rear view of an internal structure of the catalytic unit. FIG. 13 is a rear view of a lower portion of the exhaust pipe. FIG. 14 is a rear view of a gasket disposed between the lower portion of the exhaust pipe and a lower portion of the catalytic unit.

As shown in FIG. 11, the catalytic unit 42 includes a hollow catalyst case 73 connected to the exhaust pipe 41, a catalyst 74 housed in the catalyst case 73, an upstream sensor 75 measuring a concentration of the exhaust at an upstream side relative to the catalyst 74 in the direction of flow of the exhaust, and a downstream sensor 76 measuring the concentration of the exhaust at a downstream side relative to the catalyst 74. The catalyst 74 is, for example, a three-way catalyst. The catalyst 74 includes a honeycomb-shaped carrier, through the interior of which the exhaust passes, and a catalytic substance held on the surface of the carrier. Also each of the upstream sensor 75 and the downstream sensor 76 is, for example, an oxygen concentration sensor. The air-fuel ratio of the mixed gas supplied to each combustion chamber 30 is adjusted based on detection values of the upstream sensor 75 and the downstream sensor 76.

As shown in FIG. 11, the catalyst case 73 includes two exhaust inlets 77c opening at the outer surface of the catalyst case 73 and two exhaust outlets 78c opening at the outer surface of the catalyst case 73. The catalyst case 73 further includes cooling water inlets 79c opening at the outer surface of the catalyst case 73 and cooling water outlets 80c opening at the outer surface of the catalyst case 73. As shown in FIG. 12A to FIG. 12C, the catalyst case 73 includes two upstream branch pipes 81 including the two exhaust inlets 77c, two downstream branch pipes 83 including the two exhaust outlets 78c, and a catalyst housing pipe 82 extending from the two upstream branch pipes 81 to the two downstream branch pipes 83.

As shown in FIG. 12A to FIG. 12C, the exhaust inlets 77c are disposed higher than the exhaust outlets 78c. The two exhaust inlets 77c are aligned in the right/left direction, and the two exhaust outlets 78c are aligned in the right/left direction at a height lower than the exhaust inlets 77c. The two exhaust inlets 77c are respectively disposed above the two exhaust outlets 78c. As shown in FIG. 11, the cooling water inlets 79c are disposed at a periphery of the exhaust outlets 78c and the cooling water outlets 80c are disposed at a periphery of the exhaust inlets 77c. The cooling water inlets 79c and the exhaust outlets 78c open at the same plane and the cooling water outlets 80c and the exhaust inlets 77c open at the same plane.

As shown in FIG. 11, the exhaust pipe 41 includes a flat upper mounting surface 84p including the rear cooling water inlets 51 and the rear exhaust outlets 50, and a flat lower mounting surface 85p including the rear cooling water outlets 52 and the rear exhaust inlets 49. The catalyst case 73 includes a flat upper mounting surface 86c including the cooling water outlets 80c and the exhaust inlets 77c, and a flat lower mounting surface 87c including the cooling water inlets 79c and the exhaust outlets 78c. The upper mounting surface 86c is disposed behind the upper mounting surface 84p, and the lower mounting surface 87c is disposed behind the lower mounting surface 85p. The upper mounting surface 84p is mounted on the upper mounting surface 86c via the upper spacer 43 and the lower mounting surface 85p is mounted on the lower mounting surface 87c via the lower spacer 44.

As shown in FIG. 11, the upper spacer 43 includes exhaust holes 88s through which the exhaust passes and cooling water holes 89s through which the cooling water passes. Similarly, the lower spacer 44 includes exhaust holes 88s through which the exhaust passes and cooling water holes 89s through which the cooling water passes. The exhaust holes 88s and the cooling water holes 89s penetrate through the upper spacer 43 and the lower spacer 44 in the thickness direction. The rear exhaust inlets 49 and the exhaust outlets 78c are connected via the exhaust holes 88s of the lower spacer 44, and the rear exhaust outlets 50 and the exhaust inlets 77c are connected via the exhaust holes 88s of the upper spacer 43. Similarly, the rear cooling water inlets 51 and the cooling water outlets 80c are connected via the cooling water holes 89s of the upper spacer 43, and the rear cooling water outlets 52 and the cooling water inlets 79c are connected via the cooling water holes 89s of the lower spacer 44.

As shown in FIG. 14, the exhaust device 37 includes a gasket 90 disposed between the exhaust pipe 41 and the lower spacer 44 (see also FIG. 4). The gasket 90 is sandwiched by the exhaust pipe 41 and the lower spacer 44 and seals a gap between the exhaust pipe 41 and the lower spacer 44. The gasket 90 includes exhaust holes 91g, through which the exhaust passes, and cooling water holes 92g, through which the cooling water passes. The exhaust holes 91g and the cooling water holes 92g penetrate through the gasket 90 in the thickness direction. The cooling water holes 92g include a plurality of holes. The rear exhaust outlets 49 of the exhaust pipe 41 are connected to the exhaust holes 88s of the lower spacer 44 via the exhaust holes 91g of the gasket 90. The rear cooling water outlets 52 of the exhaust pipe 41 are connected to the cooling water holes 89s of the lower spacer 44 via the cooling water holes 92g of the gasket 90.

As shown in FIG. 13, the rear cooling water outlets 52 (gray portions), provided at the lower portion of the exhaust pipe 41, include a plurality of holes disposed in a periphery of the two rear exhaust inlets 49. The cooling water that flows inside the outer wall of the exhaust pipe 41 flows out from the rear cooling water outlets 52. The cooling water discharged from the rear cooling water outlets 52 flows into the cooling water inlets 79c of the catalyst case 73 via the cooling water holes 92g of the gasket 90 and the cooling water holes 92g of the lower spacer 44.

In FIG. 14, the outline of the rear cooling water outlets 52 of the exhaust pipe 41 is indicated by alternate long and two short dashed lines. As shown in FIG. 14, a portion of the outline of the rear cooling water outlets 52 is disposed outside the outline of the cooling water holes 92g (gray portion) provided in the gasket 90. The flow passage area of the cooling water holes 92g of the gasket 90 is thus smaller than the flow passage area of the rear cooling water outlets 52 of the exhaust pipe 41. Therefore, when the cooling water passes through the gasket 90, pressure loss of the cooling water occurs and the flow rate of the cooling water supplied from the exhaust pipe 41 into the catalyst case 73 decreases.

The flow passage area of the gasket 90 is less than the flow passage area of the exhaust pipe 41 and, therefore, the supply flow rate of the cooling water supplied from the exhaust pipe 41 into the catalyst case 73 decreases and the supply flow rate of the cooling water is adjusted by the gasket 90. The gasket 90 is one gasket selected from a plurality of gaskets 90 that respectively differ in the flow passage area of the cooling water holes 92g. The supply flow rate of the cooling water supplied from the exhaust pipe 41 into the catalyst case 73 is thus adjusted by selection of the gasket 90.

Figure 15:
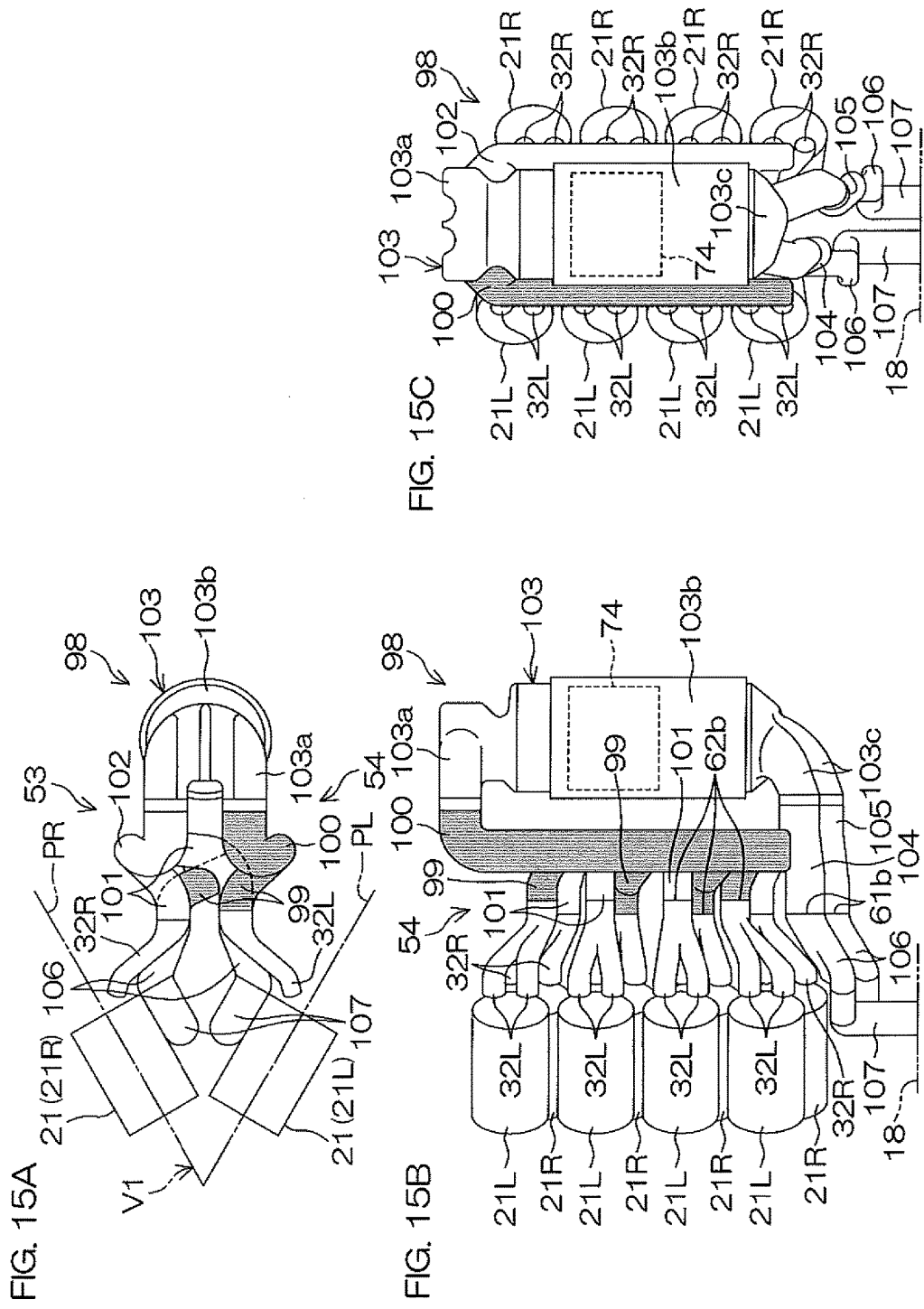
FIG. 15A is a plan view of an engine exhaust passage.
FIG. 15B is a side view of the engine exhaust passage.
FIG. 15C is a rear view of the engine exhaust passage.
Figure 16:
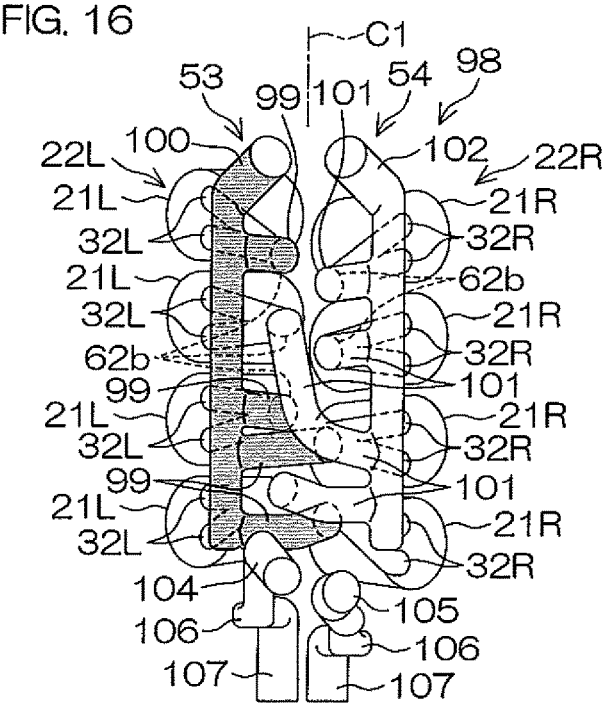
FIG. 16 is a rear view of the engine exhaust passage from which a catalyst housing passage is omitted.

FIG. 15A, FIG. 15B, and FIG. 15C are, respectively, a plan view, a side view, and a rear view of an engine exhaust passage. FIG. 16 is a rear view of the engine exhaust passage from which a catalyst housing passage is omitted.

As shown in FIG. 1, the outboard motor 4 includes an exhaust passage 93 by which the exhaust generated at the engine 9 is discharged to the exterior of the outboard motor 4. The exhaust passage 93 is provided in the interior of the outboard motor 4. The exhaust passage 93 includes an exhaust opening 94 that opens at a rear end portion of the propeller 13 (rear end portion of the outer cylinder 13a) and a main exhaust passage 95 extending from the combustion chambers 30 to the exhaust opening 94. The exhaust passage 93 further includes an idle exhaust port 96 opening at the outer surface of the outboard motor 4 and an idle exhaust passage 97 extending from the main exhaust passage 95 to the idle exhaust port 96.

As shown in FIG. 1, the main exhaust passage 95 extends downward from the engine 9 to the propeller shaft 12 via the exhaust guide 18 and extends rearward along the propeller shaft 12. The main exhaust passage 95 opens rearward at the rear end portion of the propeller 13. The exhaust opening 94 is thus disposed underwater. The idle exhaust port 96 and the idle exhaust passage 97 are disposed higher than the exhaust opening 94. The idle exhaust passage 97 branches from the main exhaust passage 95. The idle exhaust port 96 is disposed higher than a waterline WL (height of the water surface when the vessel 1, equipped with the vessel propulsion apparatus 2, is stopped). The idle exhaust port 96 thus opens into air.

The exhaust generated in the combustion chambers 30 is discharged into the main exhaust passage 95 and is guided toward the exhaust opening 94. When the output of the engine 9 is high, the exhaust inside the main exhaust passage 95 is mainly discharged underwater from the exhaust opening 94. Also, a portion of the exhaust inside the main exhaust passage 95 is guided to the idle exhaust port 96 by the idle exhaust passage 97 and is released into the atmosphere from the idle exhaust port 96. On the other hand, when the output of the engine 9 is low (for example, when the engine 9 is idling), the exhaust pressure inside the main exhaust passage 95 is low and the exhaust inside the main exhaust passage 95 is mainly released into the atmosphere from the idle exhaust port 96.

As shown in FIG. 1, the main exhaust passage 95 includes an engine exhaust passage 98 that is disposed higher than the exhaust guide 18. The engine exhaust passage 98 is provided in the cylinder bodies 27, the cylinder heads 28, the exhaust pipe 41, and the catalyst case 73. The cylinder bodies 27, the cylinder heads 28, the exhaust pipe 41, and the catalyst case 73 are preferably made, for example, of an aluminum alloy. The engine exhaust passage 98 is thus preferably made of a material that contains aluminum, which is an example of a light metal.

In FIG. 15A to FIG. 15C, illustration of the combustion chambers 30 is omitted. As shown in FIG. 15A to FIG. 15C, the engine exhaust passage 98 includes eight pairs of exhaust ports 32 respectively connected to the eight combustion chambers 30, four first branch passages 99 respectively connected to four pairs of the exhaust ports 32, and a first exhaust collecting passage 100 connected to the four first branch passages 99. The engine exhaust passage 98 further includes four second branch passages 101 respectively connected to the other four pairs of the exhaust ports 32, and a second exhaust collecting passage 102 connected to the four second branch passages 101.

As shown in FIG. 15A to FIG. 15C, the engine exhaust passage 98 further includes a catalyst housing passage 103 connected to the first exhaust collecting passage 100 and the second exhaust collecting passage 102, and a first exhaust relay passage 104 and a second exhaust relay passage 105 connected to the catalyst housing passage 103. The engine exhaust passage 98 further includes two head interior exhaust passages 106 respectively connected to the first exhaust relay passage 104 and the second exhaust relay passage 105, and two body interior exhaust passages 107 respectively connected to the two head interior exhaust passages 106.

The eight pairs of exhaust ports 32 are provided in the two cylinder heads 28. As shown in FIG. 15A to 15C, two exhaust ports 32 are provided for each cylinder 21. A pair of exhaust ports 32 are connected to a common exhaust outlet 62b that opens at the outer surface of a cylinder head 28. The pair of exhaust ports 32 merge between the combustion chamber 30 and the exhaust outlet 62b and extend from the combustion chamber 30 to the exhaust outlet 62b. The eight pairs of the exhaust ports 32 are respectively connected to the eight exhaust outlets 62b.

The four first branch passages 99 are respectively provided in the four first branch pipes 55 of the first exhaust manifold 53. Each first branch passage 99 extends from a front exhaust inlet 45 opening at the outer surface of the exhaust pipe 41 to the first exhaust collecting passage 100. As shown in FIG. 16, the four first branch passages 99 are connected to the first exhaust collecting passage 100 at respectively different heights.

As with the first branch passages 99, the four second branch passages 101 are respectively provided in the four second branch pipes 57 of the second exhaust manifold 54. Each second branch passage 101 extends from a front exhaust inlet 45 opening at the outer surface of the exhaust pipe 41 to the second exhaust collecting passage 102. As shown in FIG. 16, the four second branch passages 101 are connected to the second exhaust collecting passage 102 at respectively different heights.

As shown in FIG. 16, two of the first branch passages 99 (the two at the upper side in FIG. 16) extend toward two of the first cylinders 21L from the first exhaust collecting passage 100 and the other two first branch passages 99 (the two at the lower side in FIG. 16) extend toward two of the second cylinders 21R from the first exhaust collecting passage 100. Similarly, two of the second branch passages 101 (the two at the lower side in FIG. 16) extend toward two of the first cylinders 21L from the second exhaust collecting passage 102 and the other two second branch passages 101 (the two at the upper side in FIG. 16) extend toward two of the second cylinders 21R from the second exhaust collecting passage 102. A portion of the first branch passages 99 intersects the second branch passages 101 in a rear view. Further as shown in FIG. 15A, a portion of the first branch passages 99 intersect the second branch passages 101 in a plan view.

As shown in FIG. 16, two of the first branch passages 99 are respectively connected to the two exhaust outlets 62b provided in the first cylinder bank 22L, and the other two first branch passages 99 are respectively connected to the two exhaust outlets 62b provided in the second cylinder bank 22R. The four first branch passages 99 are thus respectively connected to four cylinders 21 (two of the first cylinders 21L and two of the second cylinders 21R).

Similarly, two of the second branch passages 101 are respectively connected to the two exhaust outlets 62b provided in the first cylinder bank 22L, and the other two second branch passages 101 are respectively connected to the two exhaust outlets 62b provided in the second cylinder bank 22R. The four second branch passages 101 are thus respectively connected to four cylinders 21 (two of the first cylinders 21L and two of the second cylinders 21R).

The first exhaust collecting passage 100 is provided in the first collecting pipe 56 of the first exhaust manifold 53. Similarly, the second exhaust collecting passage 102 is provided in the second collecting pipe 58 of the second exhaust manifold 54. The first exhaust collecting passage 100 is connected to a rear exhaust outlet 50 that opens at the outer surface of the exhaust pipe 41 and the second exhaust collecting passage 102 is connected to the other rear exhaust outlet 50.

As shown in FIG. 16, the first exhaust collecting passage 100 and the second exhaust collecting passage 102 extend in the up/down direction. The first exhaust collecting passage 100 and the second exhaust collecting passage 102 are disposed parallel or substantially parallel and spaced apart by an interval in the right/left direction and are positioned at the respective sides of the center C1 of the outboard motor 4. The first exhaust collecting passage 100 is disposed behind the four first cylinders 21L and the second exhaust collecting passage 102 is disposed behind the four second cylinders 21R.

As shown in FIG. 16, the first exhaust collecting passage 100 overlaps, in a rear view, with the first cylinders 21L and the first exhaust ports 32L, and the second exhaust collecting passage 102 overlaps, in a rear view, with the second cylinders 21R and the second exhaust ports 32R. The first exhaust collecting passage 100 extends from the height of the first cylinder 21L that is disposed uppermost among the four first cylinders 21L to the height of the first cylinder 21L that is disposed lowermost among the four first cylinders 21L. Similarly, the second exhaust collecting passage 102 extends from the height of the second cylinder 21R that is disposed uppermost among the four second cylinders 21R to the height of the second cylinder 21R that is disposed lowermost among the four second cylinders 21R.

The catalyst housing passage 103 is provided in the catalyst case 73. The catalyst housing passage 103 extends from the exhaust inlets 77c opening at the outer surface of the catalyst case 73 to the exhaust outlets 78c opening at the outer surface of the catalyst case 73. As shown in FIG. 15A to FIG. 15C, the catalyst housing passage 103 includes an upstream portion 103a, guiding the exhaust before purification from the first exhaust collecting passage 100 and the second exhaust collecting passage 102 to the catalyst 74, a catalyst housing portion 103b housing the catalyst 74, and a downstream portion 103c guiding the purified exhaust from the catalyst 74 to the first exhaust relay passage 104 and the second exhaust relay passage 105. The catalyst housing portion 103b extends from the upstream portion 103a to the down stream portion 103c. The flow passage area of the catalyst housing portion 103b is greater than the flow passage area of the first exhaust collecting passage 100 and is greater than the flow passage area of the second exhaust collecting passage 102.

The first exhaust relay passage 104 and the second exhaust relay passage 105 are provided in the exhaust pipe 41. The first exhaust relay passage 104 extends from a rear exhaust inlet 49 opening at the outer surface of the exhaust pipe 41 to a front exhaust outlet 46 opening at the outer surface of the exhaust pipe 41. Similarly, the second exhaust relay passage 105 extends from a rear exhaust inlet 49 opening at the outer surface of the exhaust pipe 41 to a front exhaust outlet 46 opening at the outer surface of the exhaust pipe 41. As shown in FIG. 15B, the first exhaust relay passage 104 and the second exhaust relay passage 105 are disposed lower than the first branch passage 99 and the second branch passage 101. The first exhaust relay passage 104 and the second exhaust relay passage 105 are respectively independent of the first branch passage 99, the second branch passage 101, the first exhaust collecting passage 100, and the second exhaust collecting passage 102 and do not intersect with these passages.

The two head interior exhaust passages 106 are respectively provided in the two cylinder heads 28. The two body interior exhaust passages 107 are respectively provided in the two cylinder bodies 27. One of the head interior exhaust passages 106 extends from the exhaust inlet 61b provided in one of the cylinder heads 28 to the interior of the cylinder head 28, and the other head interior exhaust passage 106 extends from the exhaust inlet 61b provided in the other cylinder head 28 to the interior of the cylinder head 28. As shown in FIG. 15B and FIG. 15C, each head interior exhaust passage 106 extends from the first exhaust relay passage 104 or the second exhaust relay passage 105 to a body interior exhaust passage 107, and each body interior exhaust passage 107 extends from a head interior exhaust passage 106 toward the exhaust guide 18.

The exhaust generated at two of the four combustion chambers 30 provided in the first cylinder bank 22L is discharged into two of the first branch passages 99 via two pairs of the first exhaust ports 32L. Also, the exhaust generated at two of the four combustion chambers 30 provided in the second cylinder bank 22R is discharged into the other two first branch passages 99 via two pairs of the second exhaust ports 32R. The exhaust discharged into the four first branch passages 99 is guided by the four first branch passages 99 to the first exhaust collecting passage 100 and is discharged from the first exhaust collecting passage 100 into the catalyst housing passage 103.

Meanwhile, the exhaust generated at the other two combustion chambers 3 of the first cylinder bank 22L is discharged into two of the second branch passages 101 via two pairs of the first exhaust ports 32L. Also, the exhaust generated at the other two combustion chambers 30 provided in the second cylinder bank 22R is discharged into the other two second branch passages 101 via two pairs of the second exhaust ports 32R. The exhaust discharged into the four second branch passages 101 is guided by the four second branch passages 101 to the second exhaust collecting passage 102 and is discharged from the second exhaust collecting passage 102 into the catalyst housing passage 103.

The exhaust discharged into the catalyst housing passage 103 is purified by the catalyst 74. The purified exhaust is discharged from the catalyst housing passage 103 into the first exhaust relay passage 104 and the second exhaust relay passage 105 and is discharged from the first exhaust relay passage 104 and the second exhaust relay passage 105 into the two head interior exhaust passages 106. The exhaust discharged into the two head interior exhaust passages 106 is guided by the two head interior exhaust passages 106 into the two body interior exhaust passages 107 and is discharged from the two body interior exhaust passages 107 into the interior of the exhaust guide 18.

Figure 17:
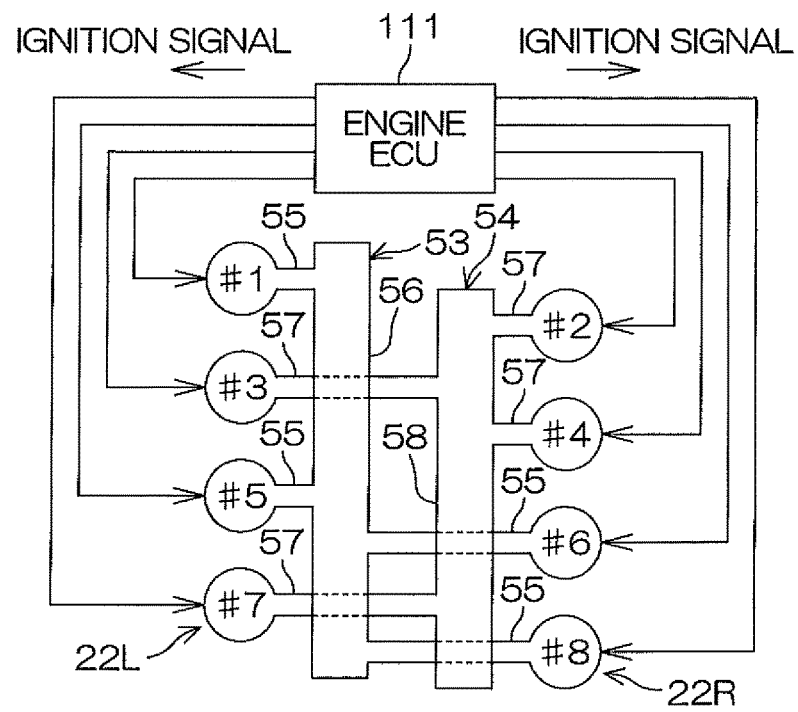
FIG. 17 is a schematic view of a connection of eight cylinders and two exhaust manifolds.
Figure 18:
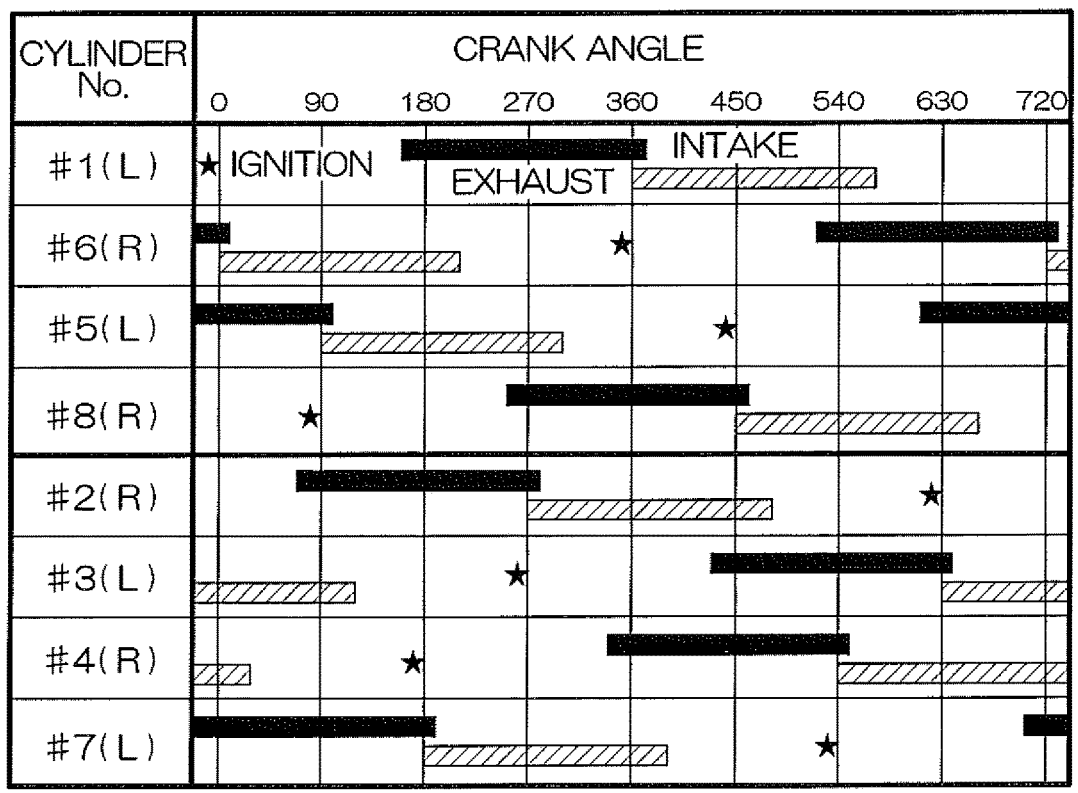
FIG. 18 is a graph of ignition timings, exhaust periods, and intake periods of the respective cylinders.

FIG. 17 is a schematic view of a connection of the eight cylinders and the two exhaust manifolds. FIG. 18 is a graph of ignition timings, exhaust periods, and intake periods of the respective cylinders.

As shown in FIG. 17, the four first cylinders 21L provided in the first cylinder bank 22L are allocated, successively from the top, to NO. 1, NO. 3, NO. 5, and NO. 7. Also, the four second cylinders 21R provided in the second cylinder bank 22R are allocated, successively from the top, to NO. 2, NO. 4, NO. 6, and NO. 8.

As shown in FIG. 17, the engine 9 includes an engine ECU (electronic control unit) 111 as a controller that controls the engine 9. The engine ECU 111 is connected to the eight spark plugs 33 (see FIG. 2) respectively corresponding to the eight cylinders 21 (the four first cylinders 21L and the four second cylinders 21R). The engine ECU 111 repeats a single cycle of igniting the eight spark plugs 33 at a 90 degree interval in the ignition sequence of NO. 1, NO. 8, NO. 4, NO. 3, NO. 6, NO. 5, NO. 7, and NO. 2.

FIG. 18 shows the ignition timings (stars), exhaust periods (black bars), and intake periods (hatched bars) of the respective cylinders 21. The bars in FIG. 18 indicate crank angles (rotation angles of the crankshaft 25). The ignition timings, exhaust periods, and intake periods of the four cylinders 21 connected to the first exhaust manifold 53 are shown in the upper box of FIG. 18, and the ignition timings, exhaust periods, and intake periods of the four cylinders 21 connected to the second exhaust manifold 54 are shown in the lower box of FIG. 18.

As shown in the upper box of FIG. 18, the first exhaust manifold 53 is connected to the two first cylinders 21L of NO. 1 and NO. 5 and to the two second cylinders 21R of NO. 6 and NO. 8. As shown in the lower box of FIG. 18, the second exhaust manifold 54 is connected to the two first cylinders 21L of NO. 3 and NO. 7 and to the two second cylinders 21R of NO. 2 and NO. 4.

As can be understood by viewing the four stars in the upper box of FIG. 18 sequentially from the left, with the four cylinders 21 connected to the first exhaust manifold 53, ignition at a 90 degree interval and ignition at a 270 degree interval are repeated alternately. Similarly, as can be understood by viewing the four stars in the lower box of FIG. 18 sequentially from the left, with the four cylinders 21 connected to the second exhaust manifold 54, ignition at a 90 degree interval and ignition at a 270 degree interval are repeated alternately.

The first manifold 53 is connected to the four cylinders 21 with which an initial period of the exhaust period when the exhaust is discharged at high pressure does not overlap with an overlap period (period in which the exhaust period and the intake period overlap). Similarly, the second manifold 54 is connected to the four cylinders 21 with which the initial period of the exhaust period when the exhaust is discharged at high pressure does not overlap with the overlap period. Exhaust interference, with which the pressure of the exhaust discharged from a certain cylinder 21 interferes with the discharge of exhaust from another cylinder 21, is thus unlikely to occur. A decrease in the output of the engine 9 due to reverse flow of intake air is thus prevented.

Figure 19:
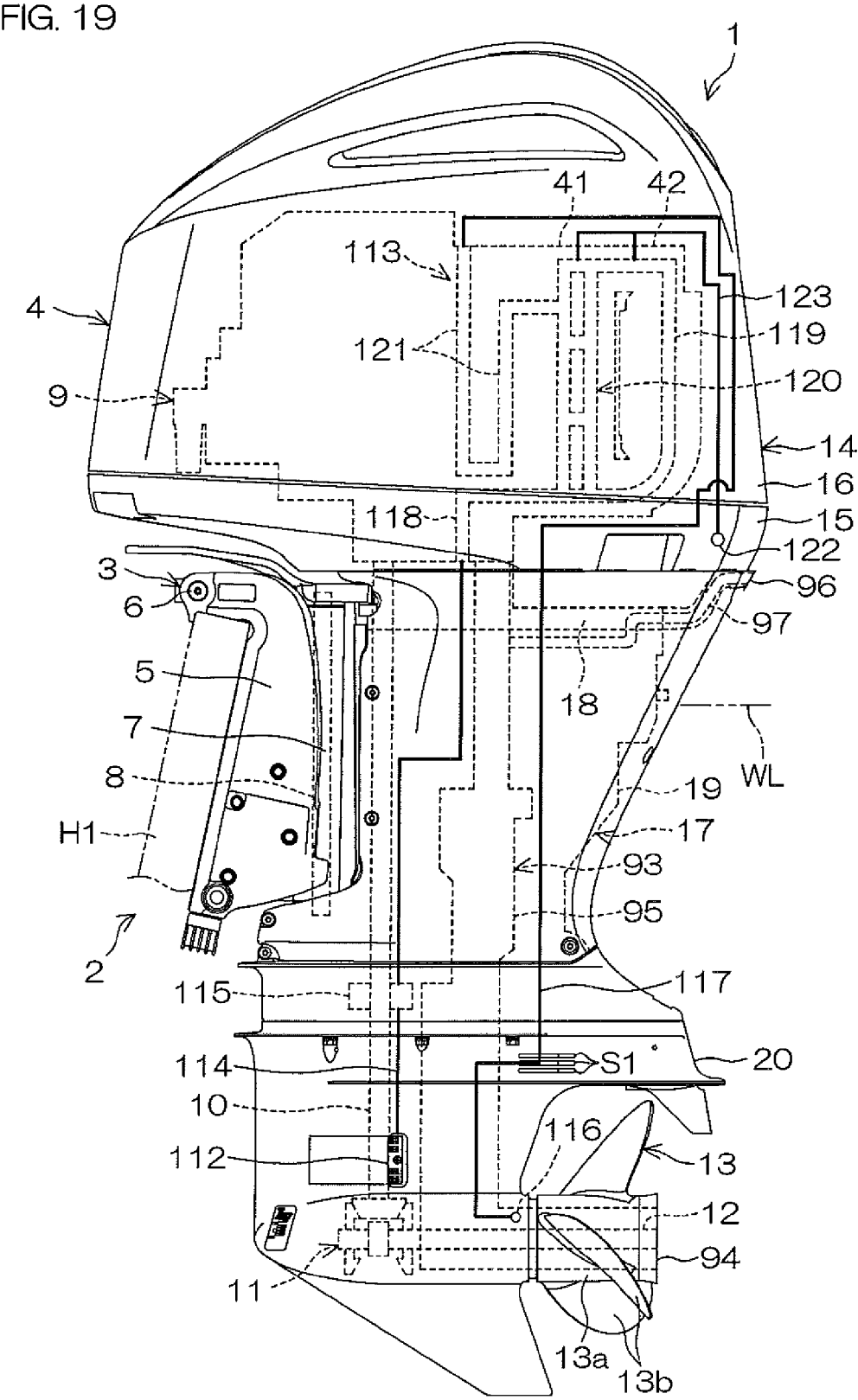
FIG. 19 is a schematic side view of an outline of a cooling device of a vessel propulsion apparatus.
Figure 20:
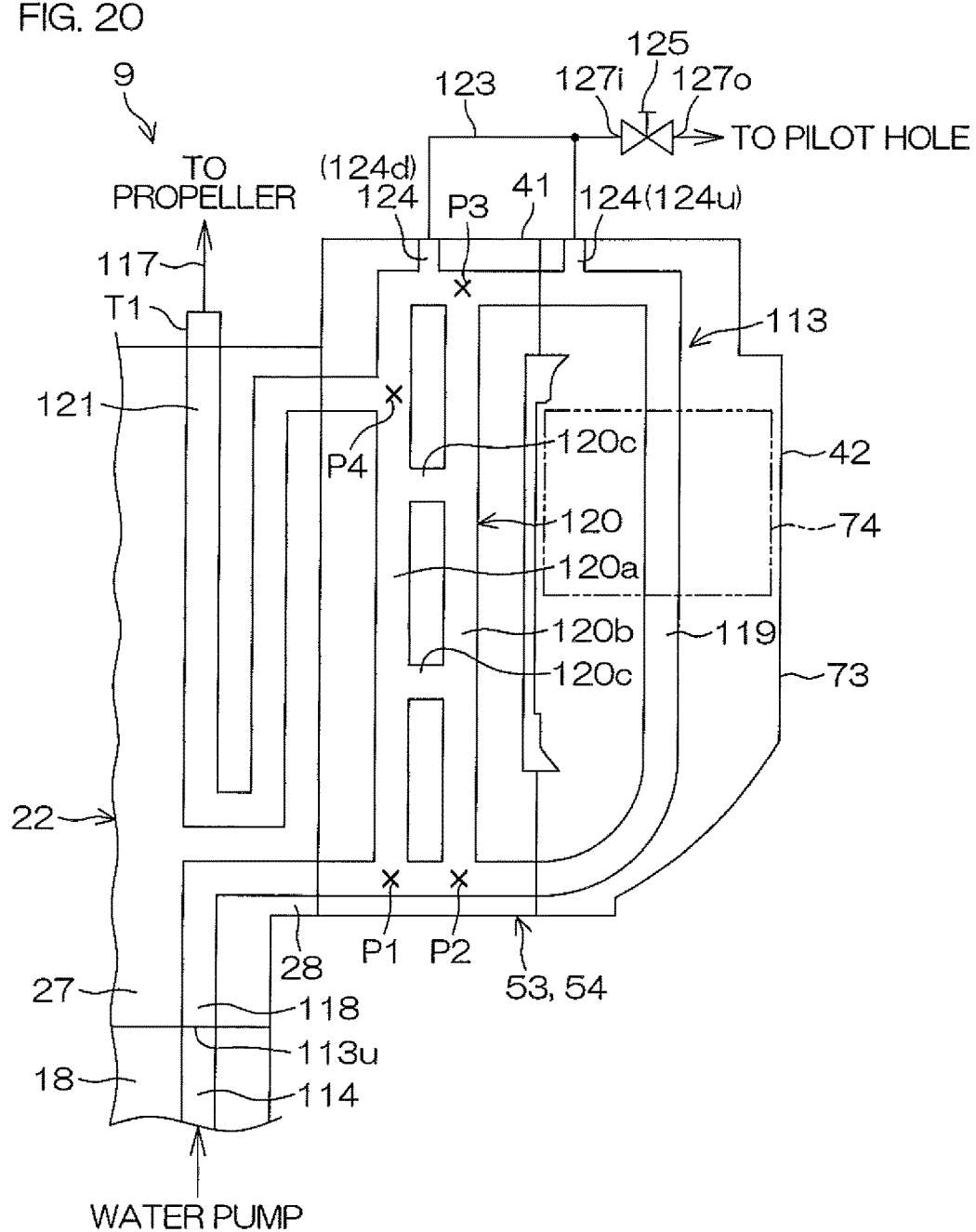
FIG. 20 is a schematic view of a cooling water passage provided in the engine.
Figure 21:
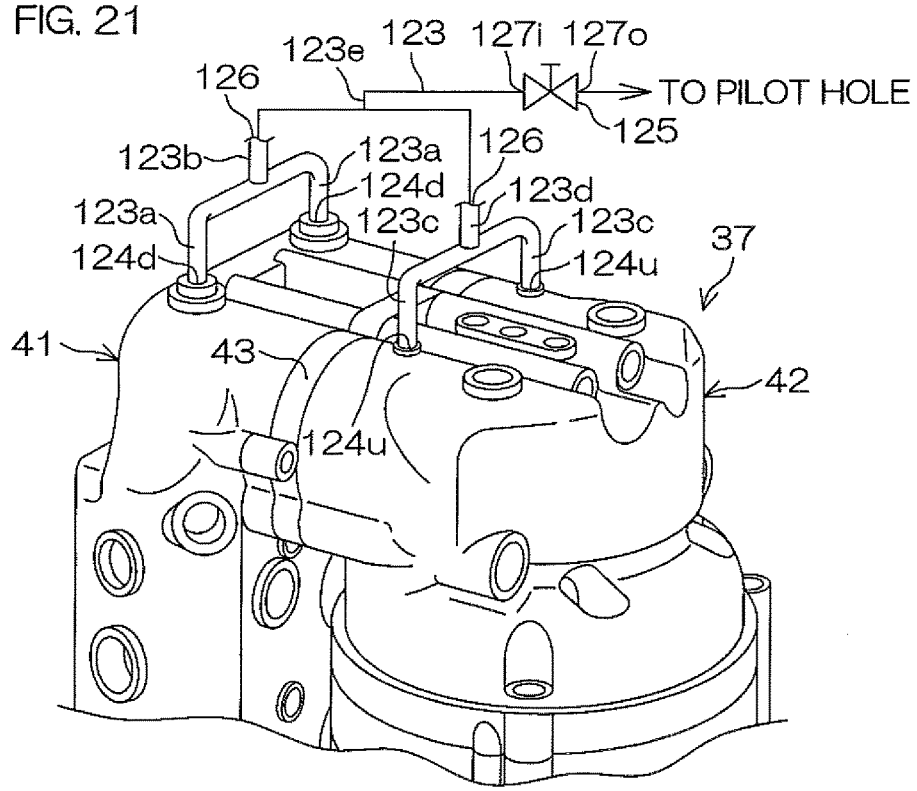
FIG. 21 is a perspective view of upper portions of the exhaust pipe and the catalytic unit.
Figure 22:
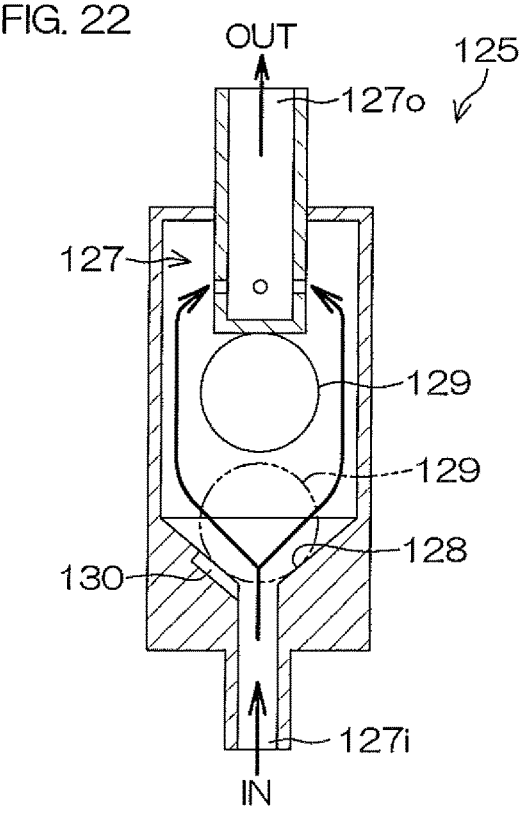
FIG. 22 is a sectional view of an internal structure of a restriction valve.

FIG. 19 is a schematic side view of an outline of a cooling device of the vessel propulsion apparatus. FIG. 20 is a schematic view of a cooling water passage provided in the engine. FIG. 21 is a perspective view of upper portions of the exhaust pipe and the catalytic unit. FIG. 22 is a sectional view of an internal structure of a restriction valve.

As shown in FIG. 19, the outboard motor 4 includes a water-cooled type cooling device that cools the interior of the outboard motor 4. The cooling device includes a water inlet 112 opening at the outer surface of the outboard motor 4, a cooling water passage (water jacket) 113 provided in the engine 9, a water supply passage 114 extending from the water inlet 112 to the cooling water passage 113, and a water pump 115 that takes the water outside the outboard motor 4 into the interior of the outboard motor 4 from the water inlet 112 as the cooling water. The cooling device further includes a water outlet 116 opening inside the exhaust passage 93 and a drain passage 117 extending inside the outboard motor 4 from the cooling water passage 113 to the water outlet 116.

As shown in FIG. 19, the water inlet 112 is disposed lower than the cooling water passage 113 and the water pump 115. The water inlet 112 opens at the outer surface of the lower case 20. The water inlet 112 is thus disposed underwater.

The water inlet 112 is connected to the cooling water passage 113 via the water supply passage 114 provided in the interior of the outboard motor 4. The water pump 115 is disposed in the water supply passage 114. The water pump 115 is thus disposed in the interior of the outboard motor 4. The water pump 115 is disposed lower than the engine 9.

As shown in FIG. 19, the water pump 115 is mounted on the driveshaft 10. The water pump 115 is a rotary pump that includes an impeller, rotating together with the driveshaft 10, and a pump case, housing the impeller. When the engine 9 rotates the driveshaft 10, the impeller rotates inside the pump case and a suction force that sucks the water outside the outboard motor 4 into the water inlet 112 is generated. The water pump 115 is thus driven by the engine 9.

As the cooling water, the water outside the outboard motor 4 is sucked into the water supply passage 114 from the water inlet 112 and is delivered from the water supply passage 114 to the cooling water passage 113 via the water pump 115. High-temperature portions of the cylinder banks 22, the exhaust device 37, etc., are thus cooled by the cooling water. The cooling water supplied to the engine 9 is guided by the drain passage 117 to the water outlet 116 and discharged from the water outlet 116 disposed inside the exhaust passage 93. The cooling water is thus discharged underwater from the exhaust opening 94 together with the exhaust.

As shown in FIG. 20, the cooling water passage 113 is disposed higher than the exhaust guide 18. The cooling water passage 113 includes an upstream water passage 118 connected to the water supply passage 114, a first parallel water passage 119 and a second parallel water passage 120 that are connected in series to the upstream water passage 118 and connected in parallel to each other, and a downstream water passage 121 connected to each of the first parallel water passage 119 and the second parallel water passage 120. The second parallel water passage 120 includes a main parallel water passage 120a and a sub parallel water passage 120b that are connected in series to the upstream water passage 118 and connected in parallel to each other, and connection water passages 120c that partially connect the main parallel water passage 120a and the sub parallel water passage 120b at intermediate junctions between the upstream water passage 118 and the downstream water passage 121.

As shown in FIG. 20, the upstream water passage 118 is provided in the cylinder banks 22 and the exhaust pipe 41. The upstream water passage 118 extends from the interiors of the cylinder banks 22 to the interior of the exhaust pipe 41. The upstream water passage 118 extends along lower end portions of the cylinder banks 22 and the exhaust pipe 41. At least a portion of the upstream water passage 118 is disposed lower than the cylinder 21 that is disposed lowermost among the plurality of cylinders 21. An upstream end of the upstream water passage 118 that corresponds to the inlet of the cooling water passage 113 is disposed lower than the exhaust pipe 41 and the catalyst case 73.

As shown in FIG. 20, the main parallel water passage 120a branches from the upstream water passage 118 at an upstream branch position P1. The first parallel water passage 119 and the sub parallel water passage 120b branch from the upstream water passage 118 at a downstream branch position P2 further downstream from the upstream branch position P1 in the direction of flow of the cooling water. The two branch positions (the upstream branch position P1 and the downstream branch position P2) are positions inside the exhaust pipe 41. The first parallel water passage 119 and the second parallel water passage 120 thus branch from the upstream water passage 118 in the interior of the exhaust pipe 41. The upstream water passage 118 is a water passage that extends from the interior of the cylinder banks 22 to the downstream branch position P2 via the upstream branch position P1.

As shown in FIG. 20, the first parallel water passage 119 is provided in the catalyst case 73. The main parallel water passage 120a and the sub parallel water passage 120b are provided in the exhaust pipe 41. The second parallel water passage 120 is thus provided in the exhaust pipe 41. The first parallel water passage 119, the main parallel water passage 120a, and the sub parallel water passage 120b extend upward from the upstream water passage 118. The first parallel water passage 119 is disposed along the catalyst housing passage 103, and the main parallel water passage 120a and the sub parallel water passage 120b are disposed along the first exhaust collecting passage 100 and the second exhaust collecting passage 102. As shown in FIG. 11, the first parallel water passage 119 is disposed at a periphery of the catalyst 74.

As shown in FIG. 20, the first parallel water passage 119 and the sub parallel water passage 120b join the downstream water passage 121 at an upstream junction position P3. The main parallel water passage 120a joins the downstream water passage 121 at a downstream junction position P4 further downstream from the upstream junction position P3 in the direction of flow of the cooling water. The two junction positions (the upstream junction position P3 and the downstream junction position P4) are positions inside the exhaust pipe 41. The first parallel water passage 119 and the second parallel water passage 120 thus join the downstream water passage 121 in the interior of the exhaust pipe 41. The downstream water passage 121 is a water passage that extends from the interior of the cylinder bank 22 to the upstream junction position P3 via the downstream junction position P4.

As shown in FIG. 20, the downstream water passage 121 is provided in the cylinder bank 22 and the exhaust pipe 41. The downstream water passage 121 extends from the interior of the exhaust pipe 41 to the interior of the cylinder bank 22. The downstream water passage 121 is disposed higher than the upstream water passage 118. The downstream water passage 121 extends along upper end portions of the cylinder bank 22 and the exhaust pipe 41. At least a portion of the downstream water passage 121 is disposed at the height of the cylinder 21 that is disposed uppermost among the plurality of cylinders 21. The downstream water passage 121 is connected to the drain passage 117.

As shown in FIG. 20, the cooling water sucked into the water inlet 112 by the water pump 115 flows from the water supply passage 114 into the upstream water passage 118 and flows from the upstream water passage 118 into each of the first parallel water passage 119, the main parallel water passage 120a, and the sub parallel water passage 120b. The cooling water that flowed into the first parallel water passage 119, the main parallel water passage 120a, and the sub parallel water passage 120b flows from each of the first parallel water passage 119, the main parallel water passage 120a, and the sub parallel water passage 120b into the downstream water passage 121. The downstream water passage 121 is connected to the drain passage 117 via a thermostat T1 that opens and closes in accordance with the temperature of the cooling water. The cooling water that flowed into the downstream water passage 121 flows from the downstream water passage 121 into the drain passage 117 and is discharged from a slit S1 (see FIG. 19) opening at the outer surface of the lower case 20. Also, a portion of the cooling water that flowed from the downstream water passage 121 into the drain passage 117 is discharged into the exhaust passage 93 from the water outlet 116 (FIG. 19).

The flow passage area of the main parallel water passage 120a of the second parallel water passage 120 is greater than the flow passage area of the sub parallel water passage 120b of the second parallel water passage 120. The flow rate of the cooling water flowing from the upstream water passage 118 into the main parallel water passage 120a is thus greater than the flow rate of the cooling water flowing from the upstream water passage 118 into the sub parallel water passage 120b. Further, the flow passage area of the second parallel water passage 120 (the sum of the flow passage area of the sub parallel water passage 120b and the flow passage area of the main parallel water passage 120a) that cools the first exhaust collecting passage 100 and the second exhaust collecting passage 102 is greater than the flow passage area of the first parallel water passage 119 that cools the catalyst housing passage 103. The flow rate of the cooling water flowing from the upstream water passage 118 into the second parallel water passage 120 is thus greater than the flow rate of the cooling water flowing from the upstream water passage 118 into the first parallel water passage 119.

As mentioned above, the exhaust pipe 41 includes the rear cooling water outlets 52 (see FIG. 13) that discharge the cooling water. The gasket 90 (see FIG. 14) is disposed between the exhaust pipe 41 and the lower spacer 44. The cooling water holes 92g of the gasket 90 define a portion of the upstream water passage 118. The flow passage area of the cooling water holes 92g of the gasket 90 is smaller than the flow passage area of the rear cooling water outlets 52 of the exhaust pipe 41. A pressure loss thus occurs in the cooling water in the process of passage of the cooling water through the gasket 90 and the flow rate of the cooling water supplied from the exhaust pipe 41 to the catalyst case 73 is decreased. The flow rate of the cooling water supplied from the upstream water passage 118 to the first parallel water passage 119 is thus adjusted, and the cooling water is supplied from the upstream water passage 118 to the second parallel water passage 120 at a greater flow rate than the flow rate of the cooling water supplied to the first parallel water passage 119.

The cylinder bodies 27, the cylinder heads 28, the exhaust pipe 41, and the catalyst case 73 are preferably made, for example, of an aluminum alloy. The cooling water passage 113 is thus made of the aluminum alloy. In addition to being made of the aluminum alloy that is lower in heat resistance than iron, the exhaust pipe 41 is smaller in volume than the cylinder bodies 27 and the cylinder heads 28. The exhaust pipe 41 is thus lower in heat capacity than the cylinder bodies 27 and the cylinder heads 28. Similarly, in addition to being made of the aluminum alloy, the catalyst case 73 is smaller in volume than the cylinder bodies 27 and the cylinder heads 28. The catalyst case 73 is thus lower in heat capacity than the cylinder bodies 27 and the cylinder heads 28.

The first parallel water passage 119 is provided in the catalyst case 73 and the second parallel water passage 120 is provided in the exhaust pipe 41. The water pump 115 supplies the water outside the outboard motor 4 that is of substantially fixed temperature regardless of the operation circumstances of the engine 9 to the first parallel water passage 119 and the second parallel water passage 120. The exhaust pipe 41 and the catalyst case 73 are thus cooled efficiently. Further, the exhaust pipe 41 is disposed further upstream than the catalyst case 73 in the direction of flow of the exhaust and, therefore, the exhaust having a higher temperature than the exhaust discharged into the catalyst case 73 is discharged into the exhaust pipe 41. The flow rate of the cooling water supplied into the second parallel water passage 120 is greater than the flow rate of the cooling water supplied into the first parallel water passage 119. The exhaust pipe 41, which is exposed to exhaust having a higher temperature, is thus cooled efficiently.

As shown in FIG. 19, the cooling device further includes a pilot hole 122 opening at the outer surface of the outboard motor 4 and a pilot passage 123 extending from the cooling water passage 113 to the pilot hole 122. As shown in FIG. 20, the cooling device further includes a plurality of vent holes 124, connecting the interior of the cooling water passage 113 to the exterior of the cooling water passage 113, and a restriction valve 125 allowing fluid to flow through from the interior of the cooling water passage 113 to the exterior of the cooling water passage 113 via the vent holes 124 and restricting the flow of fluid from the exterior of the cooling water passage 113 to the interior of the cooling water passage 113 via the vent holes 124.

As shown in FIG. 19, the pilot hole 122 is disposed higher than the water inlet 112 and the water pump 115. The pilot hole 122 opens at the outer surface of the engine cover 14. The pilot hole 122 is disposed higher than the waterline WL. The pilot hole 122 is thus exposed to air. The pilot hole 122 is connected to the plurality of vent holes 124 via the pilot passage 123 provided in the interior of the outboard motor 4. The plurality of vent holes 124 are connected to the cooling water passage 113. A portion of the cooling water supplied to the cooling water passage 113 is thus guided by the pilot passage 123 to the pilot hole 122 and is discharged into air from the pilot hole 122. A vessel operator can thus confirm that the cooling water is being supplied to the engine 9 by seeing the discharge of water from the pilot hole 122.

As shown in FIG. 21, the plurality of vent holes 124 include two downstream vent holes 124d provided in the exhaust pipe 41 and two upstream vent holes 124u provided in the catalyst case 73. The downstream vent holes 124d extend from the inner surface of the cooling water passage 113 to the outer surface of the exhaust pipe 41 and penetrate through the outer wall of the exhaust pipe 41 in its thickness direction. Similarly, the upstream vent holes 124 extend from the inner surface of the cooling water passage 113 to the outer surface of the catalyst case 73 and penetrate through the outer wall of the catalyst case 73 in its thickness direction. The downstream vent holes 124d and the upstream vent holes 124u thus connect the interior of the cooling water passage 113 to the exterior of the cooling water passage 113. The flow passage area of each vent hole 124 is smaller than the flow passage area of the cooling water passage 113.

As shown in FIG. 20, the downstream vent holes 124d are positioned at an uppermost portion of the exhaust pipe 41. The downstream vent holes 124d are thus positioned at uppermost portions of the first exhaust manifold 53 and the second exhaust manifold 54. Similarly, the upstream vent holes 124u are positioned at an uppermost portion of the catalyst case 73. The downstream vent holes 124d and the upstream vent holes 124u are disposed at an uppermost portion of the cooling water passage 113. The downstream vent holes 124d and the upstream vent holes 124u are disposed higher than the catalyst 74. The downstream vent holes 124d and the upstream vent holes 124u are positioned further downstream than the catalyst 74 in the direction of flow of the cooling water.

As shown in FIG. 20, in the direction of flow of the cooling water, the upstream vent holes 124u are disposed between the two exhaust manifolds (the first exhaust manifold 53 and the second exhaust manifold 54) and the catalyst 74. In the direction of flow of the cooling water, the downstream vent holes 124d are disposed further downstream than the upstream vent holes 124u. One of the downstream vent holes 124d is connected to the cooling water passage 113 provided in the first exhaust manifold 53 and the other downstream vent hole 124d is connected to the cooling water passage 113 provided in the second exhaust manifold 53.

As shown in FIG. 21, the pilot passage 123 includes two first passages 123a respectively connected to the two downstream vent holes 124d, a second downstream passage 123b connected to the respective first passages 123a, two third passages 123c respectively connected to the two upstream vent holes 124u, and a fourth passage 123d connected to the respective third passages 123c. The pilot passage 123 further includes a fifth passage 123e connected to the second passage 123b and the fourth passage 123d. The cooling device includes a plurality of pilot pipings 126 mounted on the exhaust pipe 41 and the catalyst case 73. A portion of the pilot passage 123 is defined by the plurality of pilot pipings 126. The flow passage area of the pilot pipings 126 is smaller than the flow passage area of the cooling water passage 113. The flow passage area of the pilot passage 123 is thus smaller than the flow passage area of the cooling water passage 113.

As shown in FIG. 21, the restriction valve 125 is disposed in the pilot passage 123. As shown in FIG. 22, the restriction valve 125 includes an internal flow passage 127, through which a fluid (at least one of either of a gas and a liquid) flows, and a spherical valve element 129 that increases and decreases the flow passage area of the internal flow passage 127 between an inlet 127i of the internal flow passage 127 and an outlet 127o of the internal flow passage 127 by opening and closing an opening of a valve seat 128 provided in the internal flow passage 127.

As shown in FIG. 21, the inlet 127i of the internal flow passage 127 is connected to the vent holes 124. The inlet 127i of the internal flow passage 127 is thus connected to the cooling water passage 113 via the vent holes 124. The pressure at the inlet 127i of the internal flow passage 127 is equal or substantially equal to the pressure inside the cooling water passage 113. Also, the outlet 127o of the internal flow passage 127 is connected to the vent holes 124 via the inlet 127i of the internal flow passage 127. The outlet 127o of the internal flow passage 127 is connected to the pilot hole 122 via the pilot passage 123. The pilot hole 122 opens into air. The pressure at the outlet 127o of the internal flow passage 127 is thus equal or substantially equal to the atmospheric pressure.

When the pressure at the inlet 127i of the internal flow passage 127 is higher than the pressure at the outlet 127o of the internal flow passage 127, the valve element 129 is moved away from the valve seat 128 by the differential pressure as indicated by solid line in FIG. 22. The valve seat 128 is thus opened and the flow passage area of the internal flow passage 127 increases. The fluid flowing into the inlet 127i of the internal flow passage 127 thus flows to the outlet 127o of the internal flow passage 127 via the valve seat 128 and is discharged from the outlet 127o of the internal flow passage 127. The fluid discharged into the vent holes 124 from the cooling water passage 113 thus flows through the pilot passage 123 toward the pilot hole 122.

On the other hand, when the pressure at the inlet 127i of the internal flow passage 127 is lower than the pressure at the outlet 127o of the internal flow passage 127, the valve element 129 is pressed against the valve seat 128 by the differential pressure as indicated by the alternate long and two short dashed lines. The valve seat 128 is thus closed and the flow passage area of the internal flow passage 127 decreases. The flow of fluid from the outlet 127o of the internal flow passage 127 to the inlet 127i of the internal flow passage 127 is thus restricted. The supplying of the fluid from the pilot passage 123 to the cooling water passage 113 is thus restricted. That is, the reverse flow of fluid from the vent holes 124 to the cooling water passage 113 is restricted.

The restriction valve 125 may be a check valve that completely stops the reverse flow of fluid (the flow of fluid from the outlet 127o of the internal flow passage 127 to the inlet 127i of the internal flow passage 127). Specifically, the restriction valve 125 may be a poppet valve or a reed valve. Also, the restriction valve 125 may be a leak valve that allows reverse flow of fluid from the outlet 127o of the internal flow passage 127 to the inlet 127i of the internal flow passage 127 at a flow rate smaller than that when the opening of the valve seat 128 is fully open. Specifically, as shown in FIG. 22, a leak groove 130 that is recessed more than the valve seat 128 and extends from an upstream side (side of the inlet 127i of the internal flow passage 127) relative to the opening provided in the valve seat 128 to a downstream side (side of the outlet 127o of the internal flow passage 127) relative to the opening may be provided in the internal surface of the internal flow passage 127.

As shown in FIG. 20, the inlet (upstream end 113u) of the cooling water passage 113 into which the cooling water flows is disposed lower than the exhaust pipe 41 and the catalyst case 73 and, therefore, the cooling water delivered from the water supply passage 114 to the cooling water passage 113 by the water pump 115 rises inside the exhaust pipe 41 and the catalyst case 73 along the cooling water passage 113. When the cooling water is supplied to the cooling water passage 113 in the state in which the cooling water passage 113 is empty, the pressure inside the cooling water passage 113 exceeds the atmospheric pressure and the restriction valve 125 opens.

When the restriction valve 125 opens, the air inside the cooling water passage 113 is discharged from the cooling water passage 113 via the plurality of vent holes 124 and the cooling water supplied by the water pump 115 fills the interior of the cooling water passage 113 smoothly. When the cooling water passage 113 is filled with the cooling water, the cooling water is discharged from the cooling water passage 113 via the plurality of vent holes 124 and is guided to the pilot hole 122 by the pilot passage 123. A portion of the cooling water inside cooling water passage 113 is thus continuously discharged out of the outboard motor 4 from the pilot hole 122.

The water inlet 112 from which the water outside the outboard motor 4 is taken in is open underwater (see FIG. 19). The water inlet 112 may thus be clogged by underwater foreign matter, such as seaweed, etc. The supply flow rate of the cooling water to the cooling water passage 113 may thus decrease or the supply of cooling water to the cooling water passage 113 may stop. Similarly, when the water pump 115 malfunctions, the supply flow rate of the cooling water to the cooling water passage 113 may decrease or the supply of cooling water to the cooling water passage 113 may stop.

The cooling water inside the cooling water passage 113 tends to flow down inside the cooling water passage 113 due to its own weight. Therefore, when clogging of the water inlet 112 or other abnormality occurs in the cooling device, the pressure inside the cooling water passage 113 decreases and the restriction valve 125 closes. Consequently, air is unlikely to enter from the vent holes 124 into the cooling water passage 113 and the rate of discharge of the cooling water from the cooling water passage 113 decreases. Therefore, even if the supply flow rate of the cooling water to the cooling water passage 113 decreases, the engine 9 continues to be cooled by the cooling water retained inside the cooling water passage 113. Overheating of the engine 9 is thus prevented. Further, even though the discharge rate of the cooling water decreases, nearly all of the cooling water is discharged from the cooling water passage 113 at a final stage and, therefore, occurrence of rust due to residual water inside the cooling water passage 113 during storage of the vessel propulsion apparatus 2 on land is reduced.

As described above, with the first preferred embodiment, the four first cylinders 21L aligned in the up/down direction are provided in the first cylinder bank 22L and the four second cylinders 21R aligned in the up/down direction are provided in the second cylinder bank 22R. The four first exhaust ports 32L are respectively connected to the four first cylinders 21L and the four second exhaust ports 32R are respectively connected to the four second cylinders 21R. The first exhaust ports 32L and the second exhaust ports 32R are disposed at the inner side of the V-shaped lines V1 with the V-shape in a plan view. The exhaust generated in the combustion chambers 30 is thus collected to the inner sides of the two cylinder banks 22 disposed in a V-shape.

The four first branch pipes 55 of the first exhaust manifold 53 are connected to the two cylinder banks 22 via the first exhaust ports 32L and the second exhaust ports 32R. Similarly, the four second branch pipes 57 of the second exhaust manifold 54 are connected to the two cylinder banks 22 via the first exhaust ports 32L and the second exhaust ports 32R. The four first branch pipes 55 are thus connected to four cylinders 21 that differ in ignition timing and the four second branch pipes 57 are connected to four cylinders 21 that differ in ignition timing. Exhaust interference is thus prevented and the engine 9 has an increased output.

Further, the first collecting pipe 56 of the first exhaust manifold 53 extends from the height of the first cylinder 21L that is disposed uppermost among the four first cylinders 21L to the height of the first cylinder 21L that is disposed lowermost among the four first cylinders 21L. Similarly, the second collecting pipe 58 of the second exhaust manifold 54 extends from the height of the second cylinder 21R that is disposed uppermost among the four second cylinders 21R to the height of the second cylinder 21R that is disposed lowermost among the four second cylinders 21R. The first collecting pipe 56 and the second collecting pipe 58 are thus long in the up/down direction. The first exhaust manifold 53 and the second exhaust manifold 54 are thus decreased in width while securing the length (passage length) of the exhaust passage 93. The engine 9 is thus compact in the width direction (right/left direction).

Further, the first collecting pipe 56 of the first exhaust manifold 53 is disposed behind the four first cylinders 21L and the second collecting pipe 58 of the second exhaust manifold 54 is disposed behind the four second cylinders 21R. Therefore, in comparison to a case where the first exhaust manifold 53 and the second exhaust manifold 54 are disposed behind a common cylinder 21, the first branch pipes 55 and the second branch pipes 57 are arranged efficiently. Therefore, not only are the shapes of the first exhaust manifold 53 and the second exhaust manifold 54 prevented from becoming complicated but the widths of the first exhaust manifold 53 and the second exhaust manifold 54 are also reduced further. The engine 9 is thus compact in the width direction.

Also with the first preferred embodiment, the second branch pipe 57 intersects the first branch pipe 55 in a plan view and, therefore, the entirety of the two exhaust manifolds (the first exhaust manifold 53 and the second exhaust manifold 54) is compact. The engine 9 is thus even more compact.

Also with the first preferred embodiment, the first collecting pipe 56 is integral and unitary with the four first branch pipes 55 and, therefore, each of the first branch pipes 55 extends from the first collecting pipe 56 to the cylinder bank 22. The first exhaust manifold 53 is thus more compact than in a case where another exhaust pipe is interposed between the first branch pipes 55 and the first collecting pipe 56. Similarly, the second collecting pipe 58 is integral and unitary with the four second branch pipes 57 and thus the second exhaust manifold 54 is more compact than in a case where another exhaust pipe is interposed between the second branch pipes 57 and the second collecting pipe 58. The engine 9 is thus even more compact.

Also with the first preferred embodiment, the first exhaust manifold 53 and the second exhaust manifold 54 are integral and unitary with the exhaust pipe 41 and the number of parts of the engine 9 is thus reduced.

Also with the first preferred embodiment, the exhaust discharged from the first exhaust manifold 53 and the second exhaust manifold 54 is purified by the catalytic unit 42. The catalytic unit 42 is disposed behind the exhaust pipe 41. That is, at least a portion of the catalytic unit 42 is disposed at the same height as the exhaust pipe 41. The height (length in the up/down direction) of the engine 9 is thus reduced more in comparison to a case where the entire catalytic unit 42 is disposed higher or lower than the exhaust pipe 41. The engine 9 is thus compact in the up/down direction.

Also with the first preferred embodiment, the exhaust discharged from the first exhaust manifold 53 and the second exhaust manifold 54 flows into the catalyst case 73 of the catalytic unit 42. The catalyst 74 is disposed inside the catalyst case 73. The exhaust that is discharged into the catalyst case 73 from the first exhaust manifold 53 and the second exhaust manifold 54 is thus purified. Further, the catalyst case 73 extends from the height of the first cylinder 21L that is disposed uppermost among the four first cylinders 21L to the height of the first cylinder 21L that is disposed lowermost among the four first cylinders 21L. The catalyst case 73 is thus long in the up/down direction. The catalyst case 73 defines a portion of the exhaust passage 93. The catalyst case 73 is thus reduced in width while securing the length of the exhaust passage 93. The engine 9 is thus compact in the width direction.

Also with the first preferred embodiment, the exhaust purified by the catalytic unit 42 is discharged from the catalytic unit 42 into the two exhaust relay passages (the first exhaust relay passage 104 and the second exhaust relay passage 105) and thereafter discharged from the first exhaust relay passage 104 and the second exhaust relay passage 105 to the two cylinder banks 22. The first exhaust relay passage 104 and the second exhaust relay passage 105 are independent of the first exhaust manifold 53 and the second exhaust manifold 54. That is, the internal spaces of the first exhaust relay passage 104 and the second exhaust relay passage 105 are separated from the internal spaces of the first exhaust manifold 53 and the second exhaust manifold 54 and do not intersect with the internal spaces of the first exhaust manifold 53 and the second exhaust manifold 54. The pre-purification exhaust in the first exhaust manifold 53 and the second exhaust manifold 54 is thus prevented from flowing into the first exhaust relay passage 104 and the second exhaust relay passage 105. Further, as with the first exhaust manifold 53 and the second exhaust manifold 54, the first exhaust relay passage 104 and the second exhaust relay passage 105 are provided in the exhaust pipe 41 and the number of parts of the engine 9 is thus reduced.

Also with the first preferred embodiment, the fixed portion 65p provided in the exhaust pipe 41 is fixed to one of the two cylinder banks 22 and the insertion portion 66 provided in the exhaust pipe 41 is movably connected to the other of the two cylinder banks 22. The exhaust pipe 41 is thus fixed to one of the cylinder banks 22 and is movably connected to the other cylinder bank 22. The respective parts of the engine 9 have dimensional tolerances and, therefore, if the exhaust pipe 41 is fixed to the two cylinder banks 22 at all locations, gaps due to dimensional variations may occur between the exhaust pipe 41 and the cylinder banks 22. Therefore, by connecting a portion (the insertion portion 66) of the exhaust pipe 41 to the other cylinder bank 22 in a manner enabling movement, the dimensional variations are absorbed. The sealing property between the exhaust pipe 41 and the cylinder banks 22 is thus improved and leakage of the exhaust is prevented.

Also with the first preferred embodiment, the exhaust generated in a plurality of combustion chambers 30 is discharged via the plurality of exhaust ports 32 into the first exhaust collecting passage 100 and the second exhaust collecting passage 102 and discharged from the first exhaust collecting passage 100 and the second exhaust collecting passage 102 into the catalyst housing passage 103. The catalyst 74 that purifies the exhaust is housed in the catalyst housing passage 103. The exhaust is thus purified in the process of flowing inside the catalyst housing passage 103.

Meanwhile, the water pump 115 takes the water outside the vessel propulsion apparatus 2 into the vessel propulsion apparatus 2 and delivers the water into the upstream water passage 118 of the cooling water passage 113. The cooling water delivered into the upstream water passage 118 is supplied respectively to the first parallel water passage 119 and the second parallel water passage 120 connected in series to the upstream water passage 118. The first parallel water passage 119 is disposed along the catalyst housing passage 103, and the second parallel water passage 120 is disposed along the first exhaust collecting passage 100 and the second exhaust collecting passage 102. The first exhaust collecting passage 100, the second exhaust collecting passage 102, and the catalyst housing passage 103 are thus cooled by the cooling water being supplied to the first parallel water passage 119 and the second parallel water passage 120, respectively.

The first parallel water passage 119 and the second parallel water passage 120 are thus connected in series to the upstream water passage 118 and connected in parallel to each other and, therefore, the resistance applied to the cooling water flowing in the cooling water passage 113 is reduced in comparison to the case where the first parallel water passage 119 and the second parallel water passage 120 are connected in series with respect to each other. The pressure loss of the cooling water that occurs in the cooling water passage 113 is thus reduced. The flow rate of the cooling water supplied to the first parallel water passage 119 and the second parallel water passage 120 is thus increased without increasing the capacity of the water pump 115. The cooling ability of the vessel propulsion apparatus 2 is thus increased and the exhaust passage 93 and the catalyst 74 is cooled reliably.

Also with the first preferred embodiment, the plurality of exhaust ports 32 connected to the two cylinder banks 22 having a V-shape are disposed at the inner side of the V-shaped lines V1. If the plurality of exhaust ports 32 are disposed at the outer side of the V-shaped lines V1, the exhaust passage must be provided at the outer side of the V-shaped lines V1 and the exhaust passage 93 thus gets longer.

The exhaust passage 93 is thus shortened by disposing the plurality of exhaust ports 32 at the inner side of the V-shaped lines V1. The vessel propulsion apparatus 2 is thus compact and lightweight. Further, the exhaust passage 93 is consolidated at the inner side of the V-shaped lines V1 to enable the exhaust generated in the respective combustion chambers 30 to be guided to the single catalyst 74 while preventing the increase of length of the exhaust passage 93. The number of parts of the vessel propulsion apparatus 2 is thus reduced.

Also with the first preferred embodiment, the exhaust pipe 41 that guides the exhaust is mounted on the two cylinder banks 22. The first exhaust collecting passage 100, the second exhaust collecting passage 102, and the second parallel water passage 120 are provided in the exhaust pipe 41. In other words, the first exhaust collecting passage 100, the second exhaust collecting passage 102, and the second parallel water passage 120 are provided in a common member. The distance between the two exhaust collecting passages (the first exhaust collecting passage 100 and the second exhaust collecting passage 102) and the second parallel water passage 120 is thus shortened and the efficiency of heat transfer between the two exhaust collecting passages and the second parallel water passage 120 is thus improved. The first exhaust collecting passage 100 and the second exhaust collecting passage 102 are thus cooled efficiently.

Also with the first preferred embodiment, the catalyst case 73 that houses the catalyst 74 is mounted on the exhaust pipe 41. The catalyst housing passage 103 and the first parallel water passage 119 are provided in the catalyst case 73. In other words, the catalyst housing passage 103 and the first parallel water passage 119 are provided in a common member. The distance between the catalyst housing passage 103 and the first parallel water passage 119 is thus shortened and the efficiency of heat transfer between the catalyst housing passage 103 and the first parallel water passage 119 is thus improved. The catalyst housing passage 103 is thus cooled efficiently.

Also with the first preferred embodiment, the gasket 90 is disposed between opening portions (the rear cooling water outlets 52) of the exhaust pipe 41 and opening portions (the cooling water inlets 79c) of the catalyst case 73. The cooling water flows from the opening portions of the exhaust pipe 41 to the opening portions of the catalyst case 73. The gasket 90 defines a portion of the cooling water passage 113 between the opening portions of the exhaust pipe 41 and the opening portions of the catalyst case 73. The flow passage area of the gasket 90 is smaller than the flow passage area of the opening portions of the exhaust pipe 41. The flow rate of the cooling water supplied from the exhaust pipe 41 to the catalyst case 73 is thus reduced by the gasket 90 and the flow rate of the cooling water supplied to the exhaust pipe 41 is increased. In regard to the direction of flow of the exhaust, the exhaust pipe 41 is disposed further upstream than the catalyst case 73. Exhaust having a higher temperature than the exhaust flowing into the catalyst case 73 thus flows into the exhaust pipe 41. Therefore, by increasing the flow rate of the cooling water supplied to the exhaust pipe 41, the exhaust pipe 41 is cooled reliably.

Also with the first preferred embodiment, the flow passage area of the second parallel water passage 120 is greater than the flow passage area of the first parallel water passage 119 and, therefore, the cooling water is supplied to the second parallel water passage 120 at a flow rate greater than the flow rate of the cooling water supplied to the first parallel water passage 119. The first parallel water passage 119 is provided along the catalyst housing passage 103 and the second parallel water passage 120 is provided along the first exhaust collecting passage 100 and the second exhaust collecting passage 102. The first exhaust collecting passage 100 and the second exhaust collecting passage 102 are disposed further upstream than the catalyst housing passage 103 in the direction of flow of the exhaust. Exhaust having a higher temperature than the exhaust flowing into the catalyst housing passage 103 thus flows into the first exhaust collecting passage 100 and the second exhaust collecting passage 102. The first exhaust collecting passage 100 and the second exhaust collecting passage 102 are thus cooled reliably by increasing the flow rate of the cooling water supplied to the second parallel water passage 120.

Also with the first preferred embodiment, at least a portion of the exhaust passage 93 is preferably made of a material containing aluminum, which is an example of a light metal. Similarly, at least a portion of the cooling water passage 113 is made of a material containing aluminum, for example. The vessel propulsion apparatus 2 is thus light in weight. On the other hand, aluminum is lower in heat resistance than iron and, therefore, the heat resistance of the exhaust passage 93 is lower than when the entire exhaust passage 93 is made of a material having iron as the main component. However, the vessel propulsion apparatus 2 is improved in cooling ability as described above and the exhaust passage 93 is cooled reliably and, therefore, not only is the vessel propulsion apparatus 2 light in weight but melting of a portion of the exhaust passage 93 is also prevented.

Also with the first preferred embodiment, the exhaust generated in the plurality of combustion chambers 30 is discharged underwater from the exhaust opening 94. The engine 9 is disposed on the exhaust guide 18 as an engine supporting member. The engine 9 is disposed higher than the water surface and, therefore, at least a portion of the exhaust guide 18 is disposed higher than the water surface. The catalyst 74 is disposed higher than the exhaust guide 18. The catalyst 74 is thus disposed higher than the water surface and the height from the water surface to the catalyst 74 is large. Water that has entered into the exhaust passage 93 from the exhaust opening 94 that is opened underwater is thus unlikely to reach the catalyst 74. Degradation of the catalyst 74 due to wetting by water is thus prevented.

Also with the first preferred embodiment, at least a portion of the cooling water passage 113 is disposed at the periphery of the catalyst 74. The water pump 115 supplies the water outside the outboard motor 4 to the cooling water passage 113 via the water inlet 112. The water pump 115 is disposed lower than the catalyst 74. At least a portion of the cooling water passage 113 is disposed higher than the water pump 115. The cooling water taken into the outboard motor 4 by the water pump 115 thus rises inside the outboard motor 4 toward the cooling water passage 113.

The interior of the cooling water passage 113 is connected to the exterior of the cooling water passage 113 by the vent holes 124. The vent holes 124 are disposed higher than the catalyst 74. As mentioned above, the water pump 115 is disposed lower than the catalyst 74. The vent holes 124 are thus disposed higher than the water pump 115. The restriction valve 125 allows fluid to flow from the interior of the cooling water passage 113 to the exterior of the cooling water passage 113 via the vent holes 124. Therefore, when the water pump 115 delivers the cooling water to the cooling water passage 113, the air inside the cooling water passage 113 is discharged to the exterior of the cooling water passage 113 via the vent holes 124. The cooling water passage 113 is thus rapidly filled with the cooling water.

When an abnormality, such as clogging of the water inlet 112, etc., occurs in the cooling device, the flow rate of supply of the cooling water to the cooling water passage 113 decreases. In this condition, the cooling water remaining inside the cooling water passage 113 tends to flow down due to its own weight. The restriction valve 125 restricts the flow of fluid from the exterior of the cooling water passage 113 to the interior of the cooling water passage 113 via the vent holes 124. The air outside the cooling water passage 113 is thus unlikely to enter into the cooling water passage 113 via the vent holes 124 and the cooling water is unlikely to be discharged from the cooling water passage 113. The rate of discharge of the cooling water from the cooling water passage 113 is thus decreased and the retention time of the cooling water inside the cooling water passage 113 is lengthened. Lowering of the cooling ability is thus significantly reduced or prevented when an abnormality occurs in the cooling device. A temperature rise of the exhaust passage 93 and the catalyst 74 is thus significantly reduced or prevented.

Also with the first preferred embodiment, the interior of the cooling water passage 113 is connected to the exterior of the cooling water passage 113 via the vent holes 124 and, therefore, a portion of the cooling water inside the cooling water passage 113 is discharged from the cooling water passage 113 through the vent holes 124. The flow passage area of the vent holes 124 is smaller than the flow passage area of the cooling water passage 113. A large portion of the cooling water inside the cooling water passage 113 thus flows toward the downstream end of the cooling water passage 113 that corresponds to the outlet of the cooling water passage 113 and cools the exhaust passage 93 and the catalyst 74. In other words, the amount of cooling water that is discharged from the cooling water passage 113 before reaching the downstream end of the cooling water passage 113 is small. The exhaust passage 93 and the catalyst 74 are thus cooled reliably.

Also with the first preferred embodiment, the vent holes 124 are positioned at the uppermost portion of the cooling water passage 113 and air is thus discharged reliably from the uppermost portion of the cooling water passage 113. Therefore, not only is the cooling water passage 113 filled with the cooling water reliably but the cooling water reaches the uppermost portion of the cooling water passage 113 reliably as well. The exhaust passage 93 and the catalyst 74 is thus cooled efficiently.

Also with the first preferred embodiment, the vent holes 124 are positioned further downstream than the catalyst 74 in the direction of flow of the cooling water and, therefore, the cooling water that is to be discharged from the cooling water passage 113 via the vent holes 124 also passes close to the catalyst 74. The catalyst 74 is thus cooled efficiently.

Also with the first preferred embodiment, the pilot passage 123 is connected to the interior of the cooling water passage 113 via the vent holes 124 and, therefore, a portion of the cooling water inside the cooling water passage 113 is discharged from the cooling water passage 113 to the pilot passage 123. The flow passage area of the pilot passage 123 is smaller than the flow passage area of the cooling water passage 113. A large portion of the cooling water inside the cooling water passage 113 thus flows toward the downstream end of the cooling water passage 113 and cools the exhaust passage 93 and the catalyst 74. In other words, the amount of cooling water that is discharged from the cooling water passage 113 before reaching the downstream end of the cooling water passage 113 is small. The exhaust passage 93 and the catalyst 74 are thus cooled reliably.

Also with the first preferred embodiment, the exhaust is guided to the catalyst 74 by the first exhaust manifold 53 and the second exhaust manifold 54 that define at least a portion of the exhaust passage 93. A portion of the cooling water passage 113 is provided in the first exhaust manifold 53 and the second exhaust manifold 54, and the first exhaust manifold 53 and the second exhaust manifold 54 are thus cooled by the cooling water supplied from the water pump 115. In the direction of flow of the cooling water, the vent holes 124 are disposed between the two exhaust manifolds (the first exhaust manifold 53 and the second exhaust manifold 54) and the catalyst 74. That is, in the direction of flow of the cooling water, the vent holes 124 extend from a portion of the cooling water passage 113 positioned between the two exhaust manifolds and the catalyst 74 to the exterior of the cooling water passage 113. A portion of the fluid present between the two exhaust manifolds and the catalyst 74 is thus discharged from the vent holes 124. Retention of the cooling water between the two exhaust manifolds and the catalyst 74 is thus prevented. The exhaust passage 93 and the catalyst 74 are thus cooled efficiently.

Also with the first preferred embodiment, the vent holes 124 are positioned at the uppermost portions of the first exhaust manifold 53 and the second exhaust manifold 54 and, therefore, the air at the uppermost portions of the first exhaust manifold 53 and the second exhaust manifold 54 is reliably discharged from the vent holes 124. A portion of the cooling water passage 113 is provided in the first exhaust manifold 53 and the second exhaust manifold 54. The cooling water thus reaches the uppermost portions of the first exhaust manifold 53 and the second exhaust manifold 54 reliably. The exhaust passage 93 and the catalyst 74 are thus cooled efficiently.

Also with the first preferred embodiment, the catalyst 74 is disposed inside the engine cover 14 that covers the engine 9, and the engine 9 and the catalyst 74 are thus close to each other. The engine 9 is disposed higher than the water surface. The catalyst 74 is thus disposed higher than the water surface and the height from the water surface to the catalyst 74 is large. Water that enters into the exhaust passage 93 from the exhaust opening 94 that is opened underwater is thus unlikely to reach the catalyst 74. Degradation of the catalyst 74 due to wetting by water is thus prevented.

Although preferred embodiments of the present invention have been described above, the present invention is not restricted to the contents of the preferred embodiments and various modifications are possible within the scope of the claims.

For example, with the preferred embodiments, a case where the engine 9 is a V-type, eight-cylinder engine that includes eight cylinders 21 was described as a non-limiting example. However, the engine 9 may include a plurality of cylinders 21 of a number other than eight. Specifically, the engine 9 may be a V-type, six-cylinder engine, a V-type, ten-cylinder engine, or a V-type, twelve cylinder engine.

Also with the preferred embodiments, a case where the engine 9 is a V-type engine and the exhaust ports 32 are disposed at the inner side of the V-shaped lines V1 was described as a non-limiting example. However, the exhaust ports 32 may be disposed at the outer side of the V-shaped lines V1 instead. The intake ports 31 may thus be disposed at the inner side of the V-shaped lines V1.

Also with the preferred embodiments, a case where the four cylinders 21 of NO. 1, NO. 5, NO. 6, and NO. 8 are connected to the first exhaust manifold 53 and the four cylinders 21 of NO. 2, NO. 3, NO. 4, and NO. 7 are connected to the second exhaust manifold 54 was described as a non-limiting example. However, four cylinders 21 (two of the first cylinders 21L and two of the second cylinders 21R) of a different combination may be connected to the first exhaust manifold 53.

Figure 23:
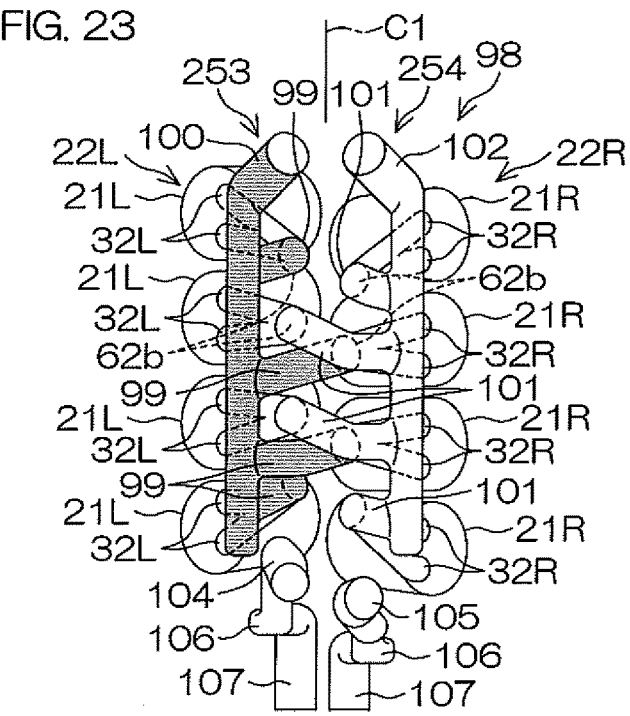
FIG. 23 is a rear view of an engine exhaust passage according to a second preferred embodiment of the present invention from which a catalyst housing passage is omitted.
Figure 24:
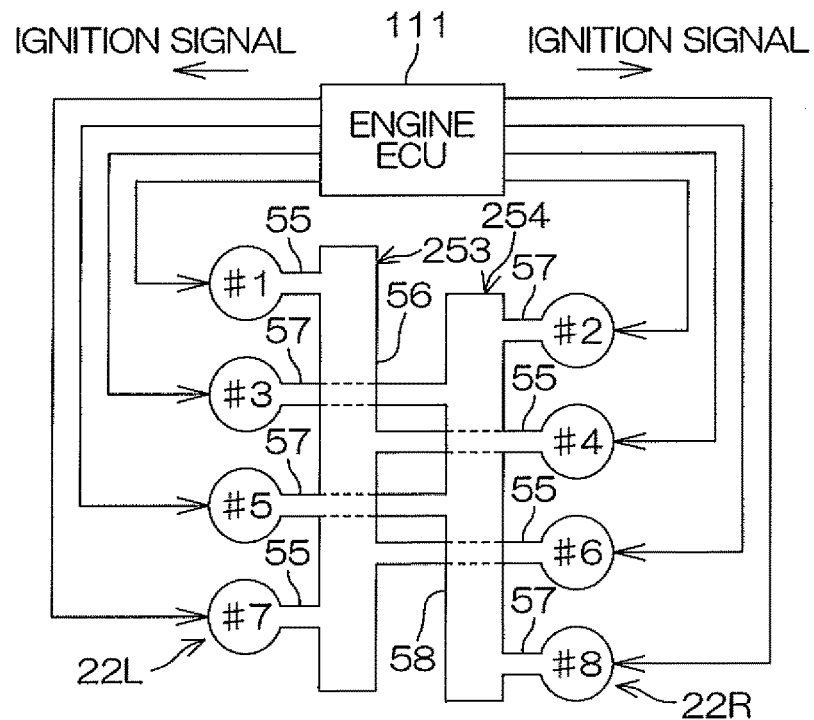
FIG. 24 is a schematic view of a connection, according to the second preferred embodiment of the present invention, of eight cylinders and two exhaust manifolds.

For example, four cylinders 21 that differ by 180 degrees each in ignition timing may be connected to each exhaust manifold. Specifically, a first exhaust manifold 253 may be connected to the two first cylinders 21L of NO. 1 and NO. 7 and the two second cylinders 21R of NO. 4 and NO. 6 as shown in FIG. 23 and FIG. 24. A second exhaust manifold 254 may thus be connected to the two first cylinders 21L of NO. 3 and NO. 5 and the two second cylinders 21R of NO. 2 and NO. 8.

Figure 25:
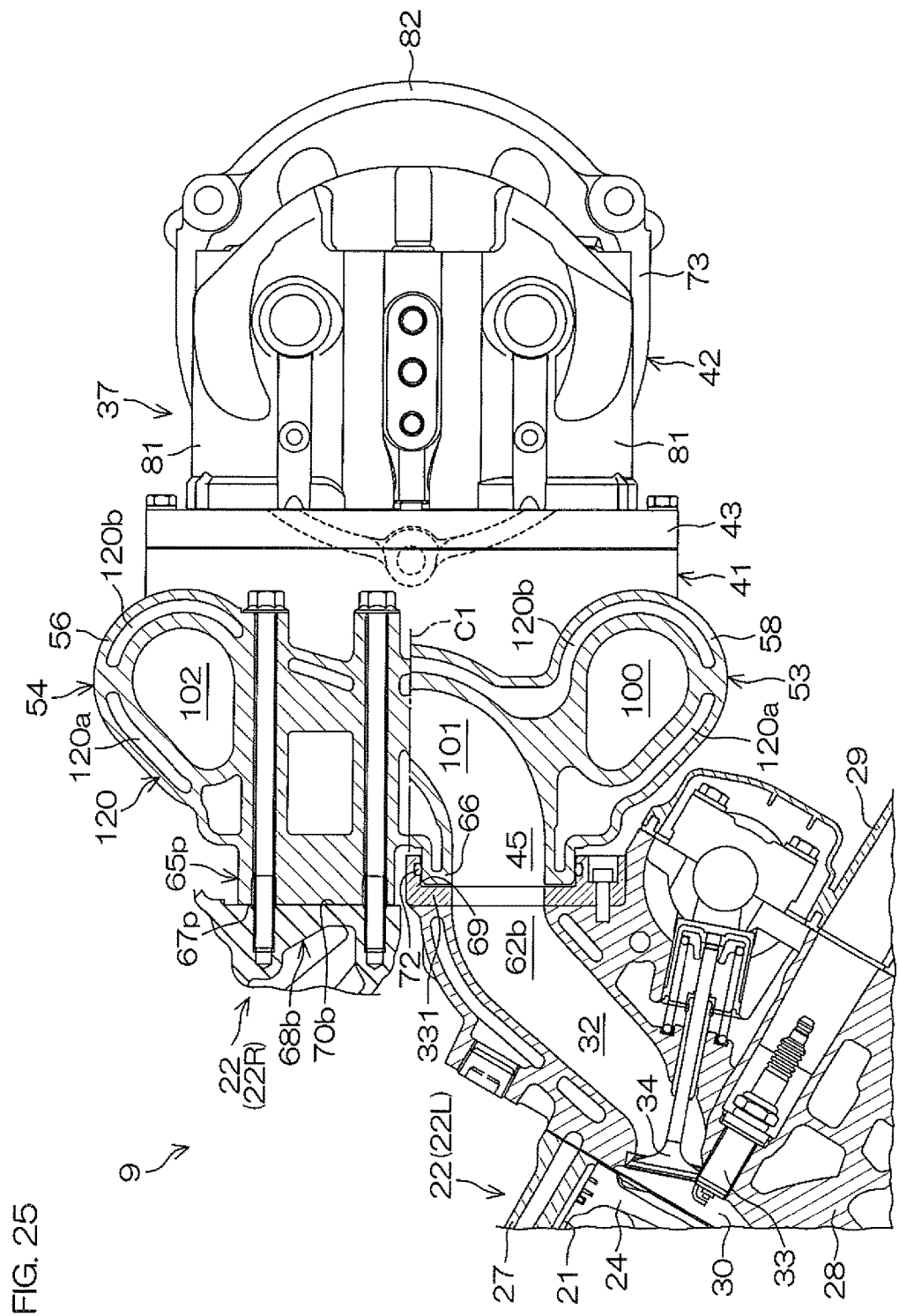
FIG. 25 is a partial sectional view of a connection, according to a third preferred embodiment of the present invention, of an exhaust pipe and an engine main body.

Also with the preferred embodiments, a case where the supporting recesses 69, into which the insertion portions 66, provided on the exhaust pipe 41, are inserted, are integral and unitary with the cylinder head 28 was described as a non-limiting example. However, the supporting recesses 69 may instead be provided in a member other than the cylinder head 28 that is mounted on the cylinder head 28. Specifically, as shown in FIG. 25, the engine 9 may include a spacer plate 331 interposed between the cylinder head 28 and the exhaust pipe 41 and the supporting recesses 69 may be provided in the spacer plate 331.

Also with the preferred embodiments, a case where the upper portion of the catalytic unit 42 is mounted on the upper portion of the exhaust pipe 41 via the upper spacer 43 and the lower portion of the catalytic unit 42 is mounted on the lower portion of the exhaust pipe 41 via the lower spacer 44 was described as a non-limiting example. However, at least one of either of the upper spacer 43 and the lower spacer 44 may be omitted.

Figure 26:
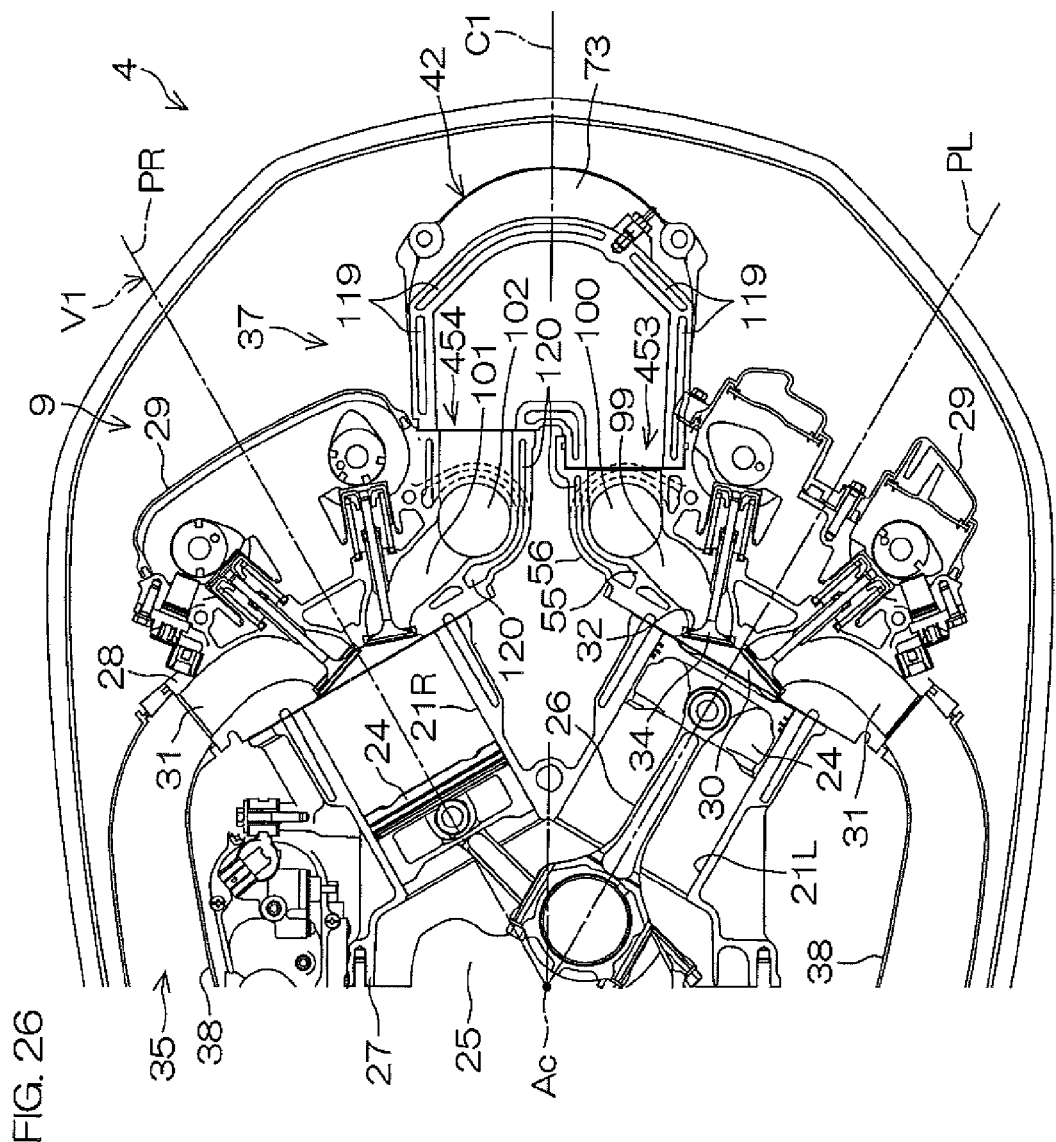
FIG. 26 is a sectional view of a portion of an engine according to a fourth preferred embodiment of the present invention as viewed from above.

Also with the preferred embodiments, a case where the first exhaust manifold 53 and the second exhaust manifold 54 are provided in a member (the exhaust pipe 41) other than the cylinder heads 28 was described as a non-limiting example. However, as shown in FIG. 26, a first exhaust manifold 453 and a second exhaust manifold 454 may be provided in the cylinder heads 28. That is, the first exhaust manifold 453 and the second exhaust manifold 454 may be integral and unitary with the cylinder heads 28. In this case, as shown in FIG. 26, the exhaust pipe 41 may be omitted and the catalytic unit 42 may be mounted directly to the two cylinder heads 28.

Also with the preferred embodiments, a case where the first exhaust manifold 53, the second exhaust manifold 54, the first relay pipe 59, and the second relay pipe 60 are provided in a member in common (the exhaust pipe 41) and are integral and unitary was described. However, at least one of the first exhaust manifold 53, the second exhaust manifold 54, the first relay pipe 59, and the second relay pipe 60 may be provided in a member other than the exhaust pipe 41.

Also with the preferred embodiments, a case where the fixed portion 65*p* provided at the exhaust pipe 41 is fixed to one of the two cylinder banks 22 and the insertion portions 66 provided at the exhaust pipe 41 are movably connected to the other of the two cylinder banks 22 was described as a non-limiting example. However, the exhaust pipe 41 may be fixed to both cylinder banks 22. That is, the exhaust pipe 41 does not need to include the insertion portions 66.

Also with the preferred embodiments, a case where the insertion portions 66 are provided at the exhaust pipe 41 and the supporting recesses 69 are provided at a cylinder bank 22 was described as a non-limiting example. However, insertion portions 66 provided at a cylinder bank 22 may be inserted in supporting recesses 69 provided at the exhaust pipe 41.

Also with the preferred embodiments, a case where the supply flow rate of the cooling water supplied from the exhaust pipe 41 to the catalyst case 73 is adjusted by the gasket 90 was described. That is, a case where the flow passage area of the cooling water holes 92*g* of the gasket 90 is smaller than the flow passage area of the rear cooling water outlets 52 of the exhaust pipe 41 was described as a non-limiting example. However, the flow passage area of the cooling water holes 92*g* may be equal to the flow passage area of the rear cooling water outlets 52 or may be greater than the flow passage area of the rear cooling water outlets 52.

Also with the preferred embodiments, a case where the flow passage area of the second parallel water passage 120 that cools the first exhaust collecting passage 100 and the second exhaust collecting passage 102 is greater than the flow passage area of the first parallel water passage 119 that cools the catalyst housing passage 103 was described as a non-limiting example. However, the flow passage area of the second parallel water passage 120 may be equal to the flow passage area of the first parallel water passage 119 or may be smaller than the flow passage area of the first parallel water passage 119. Also, the flow passage area of the main parallel water passage 120*a* of the second parallel water passage 120 may be equal to the flow passage area of the sub parallel water passage 120*b* of the second parallel water passage 120 or may be smaller than the flow passage area of the sub parallel water passage 120*b*.

Also with the preferred embodiments, a case where the first parallel water passage 119 provided at the catalyst case 73 and the second parallel water passage 120 provided at the exhaust pipe 41 are connected in parallel to the upstream water passage 118 was described as a non-limiting example. However, the first parallel water passage 119 and the second parallel water passage 120 may be connected in series to each other instead. Specifically, the first parallel water passage 119 as a first serial water passage may extend from the upstream water passage 118 to the second parallel water passage 120, and the second parallel water passage 120 as the first serial water passage may extend from the first parallel water passage 119 to the downstream water passage 121. That is, the upstream water passage 118, the first parallel water passage 119, the second parallel water passage 120, and the downstream water passage 121 may be connected in series in that order from the upstream side in the direction of flow of the cooling water.

Also with the preferred embodiments, a case where the restriction valve 125 is opened and closed in accordance with the pressure inside the cooling water passage 113 was described as a non-limiting example. However, a solenoid valve that is opened and closed by an electromagnetic force may be used instead as the restriction valve 125.

Specifically, as shown in FIG. 27, the engine 9 may include a temperature detecting apparatus 532, detecting a temperature of the engine 9, and a restriction valve 525

(solenoid valve), opened and closed by the engine ECU 111 based on the detection value of the temperature detecting apparatus 532. In this case, the temperature of the outer wall of the engine 9 is detected by the temperature detecting apparatus 532 and the detection value of the temperature detecting apparatus 532 is input to the engine ECU 111. Based on the detection value of the temperature detecting apparatus 532, the engine ECU 111 judges whether or not the engine 9 is overheated. That is, the engine ECU 111 judges whether or not the temperature of the engine 9 is not less than an overheating temperature.

When an abnormality occurs in the cooling device, the flow rate of the cooling water supplied to the cooling water passage 113 decreases and the temperature of the engine 9 thus increases. When the temperature of the engine 9 reaches the overheating temperature, the engine ECU 111 closes the restriction valve 525 that is normally open and maintains the state in which the restriction valve 525 is closed until the temperature of the engine 9 falls to less than the overheating temperature. Therefore, when an abnormality occurs in the cooling device, the discharge of cooling water from the cooling water passage 113 is restricted and lowering of the cooling ability is significantly reduced or prevented. The engine ECU 111 thus prevents the overheating temperature of the exhaust passage 93 and the catalyst 74.

Also with the preferred embodiments, a case where the restriction valve 125 is a ball valve that includes a spherical valve element 129 was described as a non-limiting example. However, the restriction valve 125 may be a poppet valve with a conical valve element or a reed valve that includes a reed as a valve element or a valve of any other type. That is, the shape of the valve element 129 is not restricted to being spherical and may be conical or any other shape.

Also with the preferred embodiments, a case where the vent holes 124 are positioned at the uppermost portion of the cooling water passage 113 was described as a non-limiting example. However, the vent holes 124 may be disposed in a portion of the cooling water passage 113 other than the uppermost portion.

Also with the preferred embodiments, a case where, in the direction of flow of the cooling water, the vent holes 124 are disposed between the two exhaust manifolds (the first exhaust manifold 53 and the second exhaust manifold 54) and the catalyst 74 was described as a non-limiting example. However, the vent holes 124 may be disposed further upstream than the two exhaust manifolds or may be disposed further downstream than the catalyst 74.

The present application corresponds to Japanese Patent Application No. 2013-035068 filed on Feb. 25, 2013 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine including a plurality of cylinders disposed along a V-shaped line when viewed in a plan view of the engine and a pair of cylinder heads including a plurality of exhaust ports disposed inside the V-shaped line;
   an exhaust passage that includes an exhaust pipe and guides an exhaust generated in the engine, the exhaust passage including a catalyst housing passage into which the exhaust from the plurality of exhaust ports flows, the catalyst housing passage disposed inside the V-shaped line and provided in a catalyst case;
   a catalyst disposed inside the catalyst housing passage and that purifies the exhaust flowing inside the exhaust passage;
   a cooling water passage including at least a portion disposed at a periphery of the catalyst and that guides cooling water that cools the exhaust passage;
   a water pump disposed lower than the catalyst and that supplies water from outside the outboard motor as the cooling water to the cooling water passage via a water inlet that opens at an outer surface of the outboard motor; and
   a plurality of vent holes that are disposed higher than the catalyst and that connect an interior of the cooling water passage to an exterior of the cooling water passage; wherein
   each of the plurality of vent holes is provided in the exhaust pipe or in the catalyst case.

2. An outboard motor comprising:
   an engine including a plurality of cylinders disposed along a V-shaped line when viewed in a plan view of the engine and a pair of cylinder heads including a plurality of exhaust ports disposed inside the V-shaped line;
   an exhaust passage that guides an exhaust generated in the engine, the exhaust passage including a catalyst housing passage into which the exhaust from the plurality of exhaust ports flows, the catalyst housing passage disposed inside the V-shaped line;
   a catalyst disposed inside the catalyst housing passage and that purifies the exhaust flowing inside the exhaust passage;
   a cooling water passage including at least a portion disposed at a periphery of the catalyst and that guides cooling water that cools the exhaust passage;
   a water pump disposed lower than the catalyst and that supplies water from outside the outboard motor as the cooling water to the cooling water passage via a water inlet that opens at an outer surface of the outboard motor; and
   a vent hole disposed higher than the catalyst and that connects an interior of the cooling water passage to an exterior of the cooling water passage; wherein
   a flow passage area of the vent hole is smaller than a flow passage area of the cooling water passage.

3. The outboard motor according to claim 1, wherein the plurality of vent holes are positioned at an uppermost portion of the cooling water passage.

4. The outboard motor according to claim 1, wherein the plurality of vent holes are positioned further downstream than the catalyst in a direction of flow of the cooling water.

5. The outboard motor according to claim 1, wherein the outboard motor further comprises:
   a pilot hole that opens to air; and
   a pilot piping defining at least a portion of a pilot passage that guides a fluid between the plurality of vent holes and the pilot hole.

6. An outboard motor comprising:
   an engine including a plurality of cylinders disposed along a V-shaped line when viewed in a plan view of the engine and a pair of cylinder heads including a plurality of exhaust ports disposed inside the V-shaped line;
   an exhaust passage that guides an exhaust generated in the engine, the exhaust passage including a catalyst housing passage into which the exhaust from the plurality of exhaust ports flows, the catalyst housing passage disposed inside the V-shaped line;
a catalyst disposed inside the catalyst housing passage and that purifies the exhaust flowing inside the exhaust passage;
a cooling water passage including at least a portion disposed at a periphery of the catalyst and that guides cooling water that cools the exhaust passage;
a water pump disposed lower than the catalyst and that supplies water from outside the outboard motor as the cooling water to the cooling water passage via a water inlet that opens at an outer surface of the outboard motor;
a vent hole disposed higher than the catalyst and that connects an interior of the cooling water passage to an exterior of the cooling water passage;
a pilot hole that opens to air; and
a pilot piping defining at least a portion of a pilot passage that guides a fluid between the vent hole and the pilot hole; wherein
a flow passage area of the pilot passage is smaller than a flow passage area of the cooling water passage.

7. An outboard motor comprising:
an engine including a plurality of cylinders disposed along a V-shaped line when viewed in a plan view of the engine and a pair of cylinder heads including a plurality of exhaust ports disposed inside the V-shaped line;
an exhaust passage that guides an exhaust generated in the engine, the exhaust passage including a catalyst housing passage into which the exhaust from the plurality of exhaust ports flows, the catalyst housing passage disposed inside the V-shaped line;
a catalyst disposed inside the catalyst housing passage and that purifies the exhaust flowing inside the exhaust passage;
a cooling water passage including at least a portion disposed at a periphery of the catalyst and that guides cooling water that cools the exhaust passage;
a water pump disposed lower than the catalyst and that supplies water from outside the outboard motor as the cooling water to the cooling water passage via a water inlet that opens at an outer surface of the outboard motor;
a vent hole disposed higher than the catalyst and that connects an interior of the cooling water passage to an exterior of the cooling water passage; and
a pair of exhaust manifolds defining at least a portion of the exhaust passage and that guides the exhaust generated in the engine to the catalyst; wherein
a portion of the cooling water passage is provided in the pair of exhaust manifolds; and
the vent hole is disposed between the pair of exhaust manifolds and the catalyst in a direction of flow of the cooling water.

8. The outboard motor according to claim 7, wherein the vent hole is positioned at an uppermost portion of the exhaust manifold.

9. The outboard motor according to claim 1, wherein the outboard motor further comprises an engine cover that covers the engine, and the catalyst is disposed inside the engine cover.

10. The outboard motor according to claim 1, wherein at least a portion of the exhaust passage is made of a material that contains aluminum, and at least a portion of the cooling water passage is made of a material that contains aluminum.

11. The outboard motor according to claim 7, wherein
the plurality of cylinders include a first plurality of cylinders and a second plurality of cylinders;
the pair of exhaust manifolds include a first exhaust manifold and a second exhaust manifold; and
in a rear view of the engine, the first exhaust manifold overlaps with the first plurality of cylinders and the second exhaust manifold overlaps with the second plurality of cylinders.

12. The outboard motor according to claim 11, wherein a flow passage area of the catalyst housing portion is greater than a flow passage area of the first exhaust manifold and is greater than a flow passage area of the second exhaust manifold.

13. A vessel comprising:
the outboard motor according to claim 1; and
a hull propelled by the outboard motor.

* * * * *